United States Patent
Hirai et al.

(10) Patent No.: US 6,971,095 B2
(45) Date of Patent: Nov. 29, 2005

(54) AUTOMATIC FIRMWARE VERSION UPGRADE SYSTEM

(75) Inventors: Giro Hirai, Kawasaki (JP); Mikayo Kosugi, Kawasaki (JP); Shouichi Matsuoka, Kawasaki (JP); Yasushi Makiyama, Kawasaki (JP); Takanori Shimizu, Kawasaki (JP); Kazuhiro Matsushita, Itano (JP); Junichi Nagase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 09/785,232

(22) Filed: Feb. 20, 2001

(65) Prior Publication Data

US 2001/0044934 A1 Nov. 22, 2001

(30) Foreign Application Priority Data

May 17, 2000 (JP) .................................... 2000-144816

(51) Int. Cl.[7] .............................................. G06F 9/44
(52) U.S. Cl. .......................................... 717/173; 713/2
(58) Field of Search ................................. 717/168–178; 713/2; 714/48

(56) References Cited

U.S. PATENT DOCUMENTS

| | | | | |
|---|---|---|---|---|
| 5,737,585 A | | 4/1998 | Kaneshima | .................. 703/20 |
| 6,092,190 A | * | 7/2000 | Lee | ................................ 713/2 |
| 6,266,809 B1 | * | 7/2001 | Craig et al. | .................. 717/173 |
| 6,275,931 B1 | * | 8/2001 | Narayanaswamy et al. | .... 713/2 |
| 6,457,175 B1 | * | 9/2002 | Lerche | ........................ 717/173 |
| 6,493,781 B1 | * | 12/2002 | Saville et al. | ................ 710/260 |
| 6,625,809 B1 | * | 9/2003 | Duff | ........................... 717/169 |

FOREIGN PATENT DOCUMENTS

| | | |
|---|---|---|
| JP | 5-181650 | 7/1993 |
| JP | 7-210395 | 8/1995 |
| JP | 11-161518 | 6/1999 |

* cited by examiner

*Primary Examiner*—Anil Khatri
*Assistant Examiner*—Lawrence Shrader
(74) *Attorney, Agent, or Firm*—Staas & Halsey LLP

(57) ABSTRACT

A reception unit receives resource information transmitted through a network and constituted by a resource for version-up and an application program which applies the resource and stores the resource information in an operation region of a storage device. A decision unit decides whether an application occasion of the resource stored has come or not. When it is decided that the application occasion has come, an execution unit performs a process of copying the resource information in a maintenance region of the storage device and making the maintenance region valid in the next boot-up operation of a system.

9 Claims, 22 Drawing Sheets

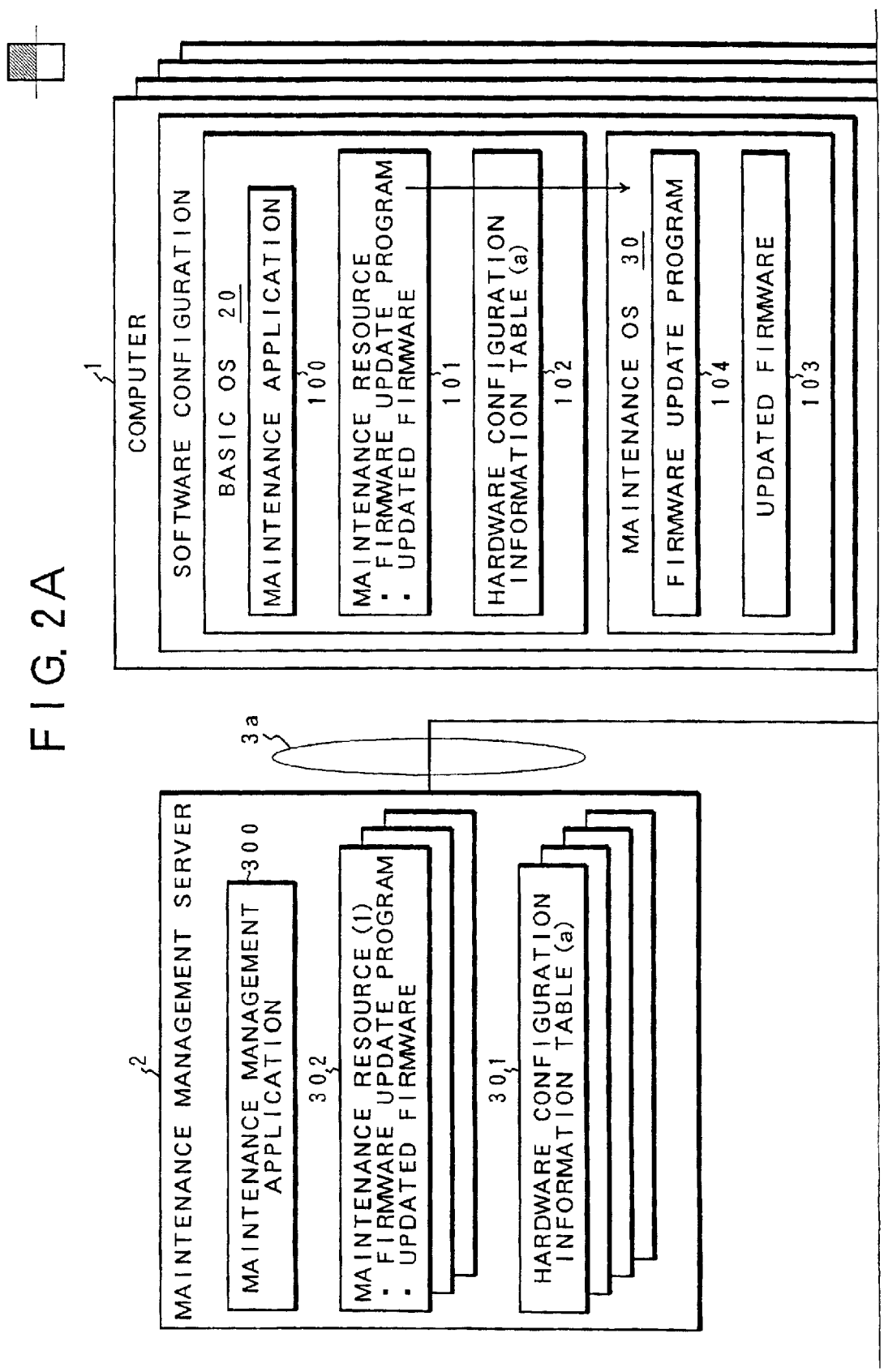

FIG. 3A

| |
|---|
| BOOT SECTOR (512 BYTE) |
| FILE ALLOCATION TABLE 1 |
| FILE ALLOCATION TABLE 2 |
| ROOT DIRECTORY |
| MAINTENANCE OS REGION |
| BASIC OS REGION |

FIG. 3B

| | |
|---|---|
| 0x000 | JMP INSTRUCTION |
| 0x003 | OEM IDENTIFICATION FIELD |
| 0x00B | BIOS PARAMETER BLOCK |
| 0x03C | BOOT STRAP LOADER |
| 0x1BE | PARTITION TABLE |
| 0x1FE | BOOT CERTIFICATION WORD (0xAA55) |

FIG. 3C

| | +0 | +1 | +2 | +3 | +4 | +5 | +6 | +7 | +8~+11 | +12~+15 |
|---|---|---|---|---|---|---|---|---|---|---|
| 0x1BE | BI | H | S | C | SI | H | S | C | SP | N |
| 0x1CE | BI | H | S | C | SI | H | S | C | SP | N |
| 0x1DE | BI | H | S | C | SI | H | S | C | SP | N |
| 0x1EE | BI | H | S | C | SI | H | S | C | SP | N |

FIG. 4

| OFFSET | SIZE | SIGN | CONTENTS |
|---|---|---|---|
| +0 | 1 BYTE | BI | BOOT INDICATOR 0x80 : ACTIVE PARTITION |
| +1~+3 | 3 BYTE | H/S/C | HEAD NUMBER/SECTOR NUMBER/CYLINDER NUMBER OF START POINT |
| +4 | 1 BYTE | SI | SYSTEM INDICATOR |
| +5~+7 | 3 BYTE | H/S/C | HEAD NUMBER/SECTOR NUMBER/CYLINDER NUMBER OF END POINT |
| +8~+11 | 4 BYTE | SP | THE NUMBER OF PREVIOUS PARTITION SECTORS |
| +12~+15 | 4 BYTE | N | THE NUMBER OF SELF-PARTITION SECTORS |

FIG. 5A

|        | +0<br>BI | +1~+3<br>H/S/C | +4<br>SI | +5~+7<br>H/S/C | +8~+11<br>SP | +12~+15<br>N |
|--------|------|----------|------|----------|-----------|-----------|
| 0x1BE  | 0x00 | 0xXXXXXX | 0x00 | 0xXXXXXX | 0xXXXXXXXX | 0xXXXXXXXX |
| 0x1CE  | 0x80 | 0xXXXXXX | 0x00 | 0xXXXXXX | 0xXXXXXXXX | 0xXXXXXXXX |

FIG. 5B

|        | +0<br>BI | +1~+3<br>H/S/C | +4<br>SI | +5~+7<br>H/S/C | +8~+11<br>SP | +12~+15<br>N |
|--------|------|----------|------|----------|-----------|-----------|
| 0x1BE  | 0x80 | 0xXXXXXX | 0x00 | 0xXXXXXX | 0xXXXXXXXX | 0xXXXXXXXX |
| 0x1CE  | 0x00 | 0xXXXXXX | 0x00 | 0xXXXXXX | 0xXXXXXXXX | 0xXXXXXXXX |

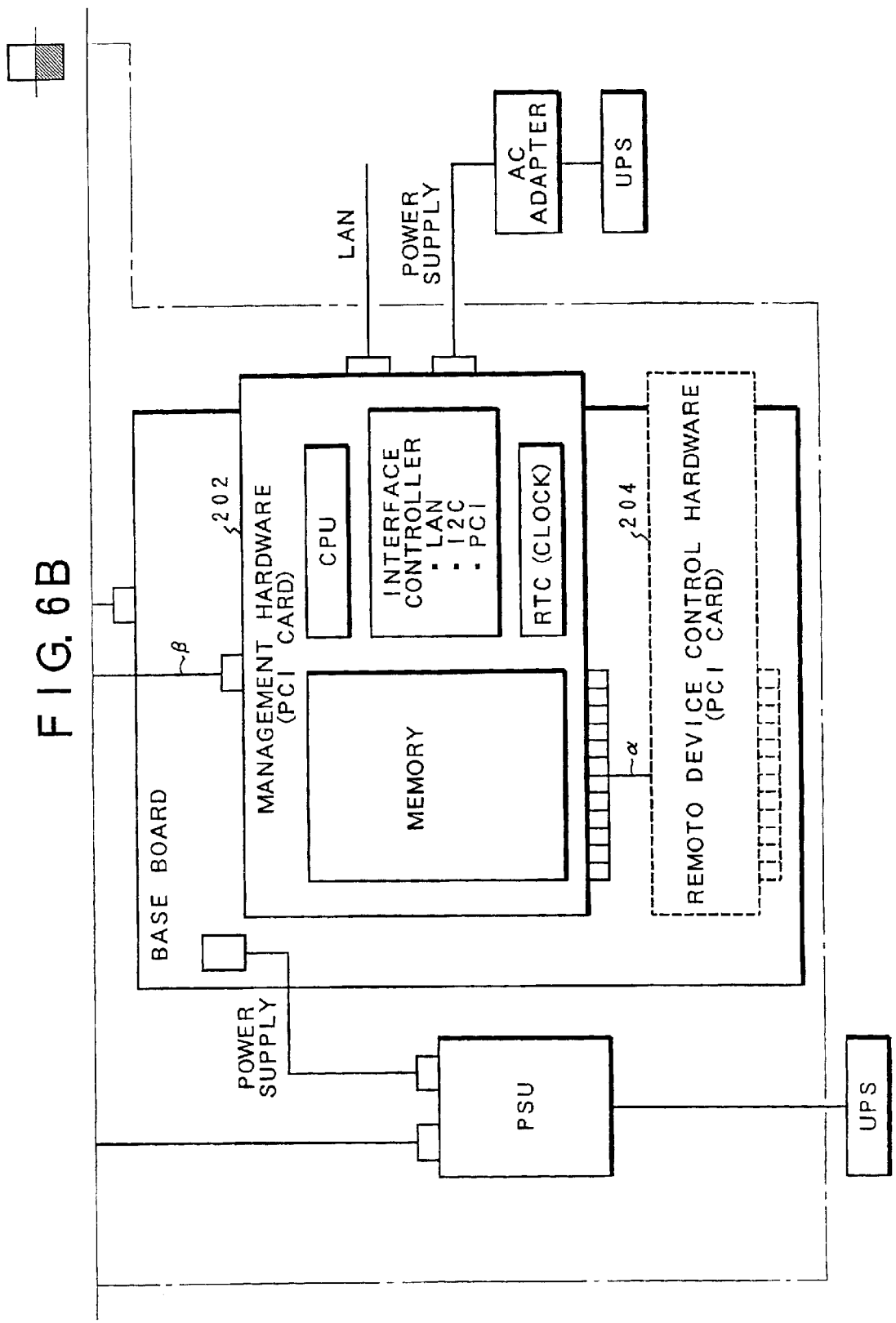
F I G. 6B

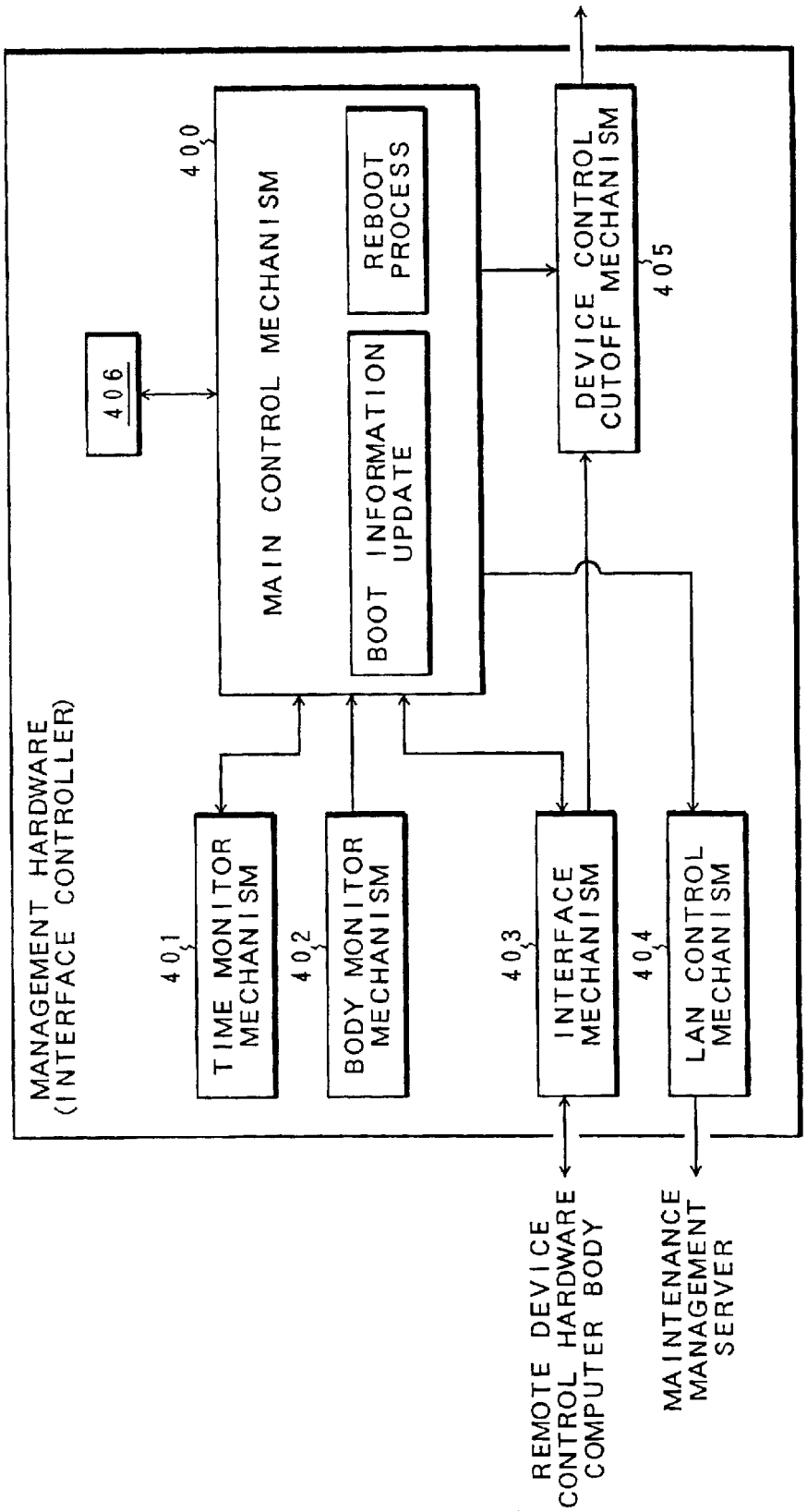

FIG. 8A
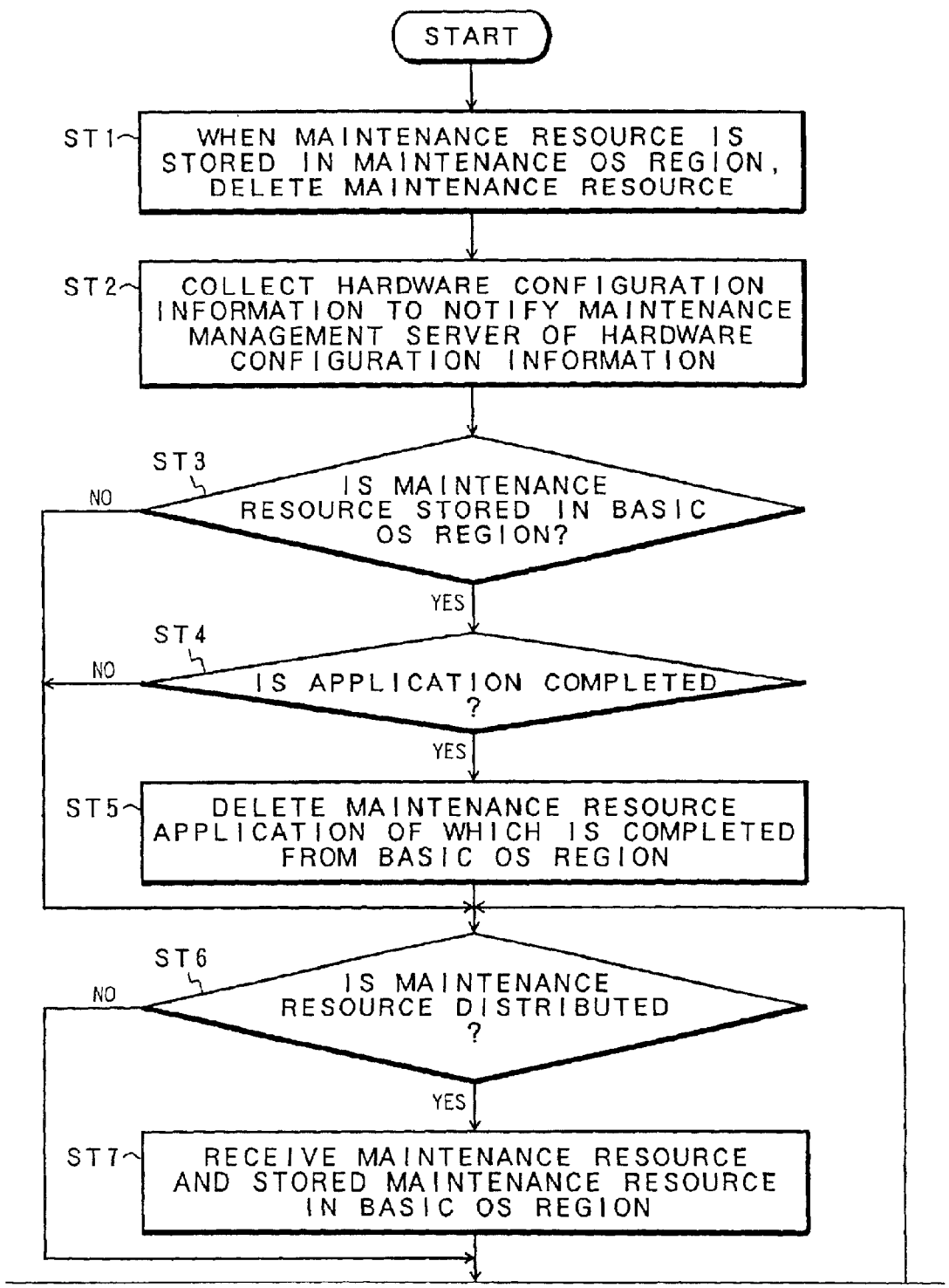

FIG. 10A
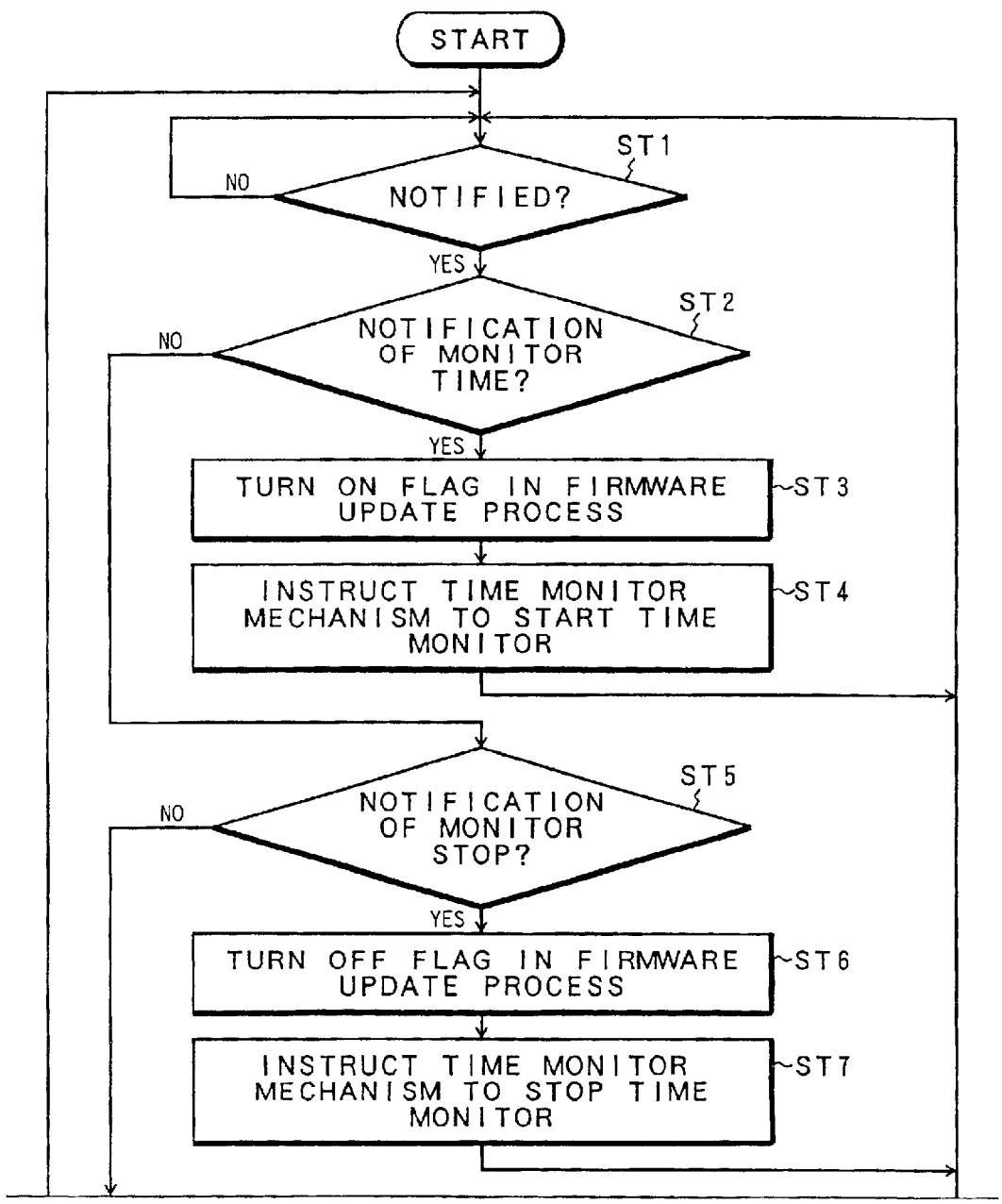

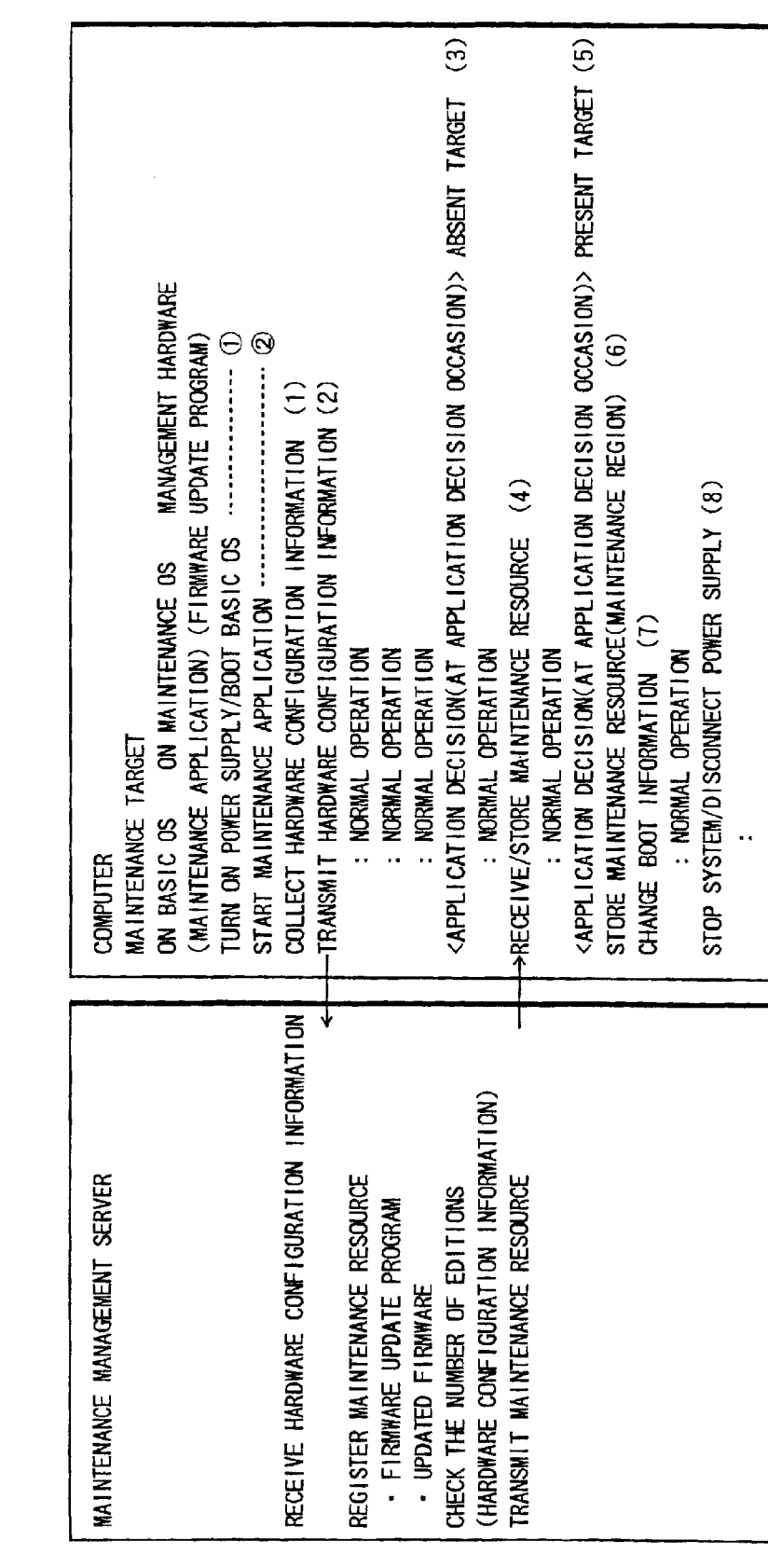

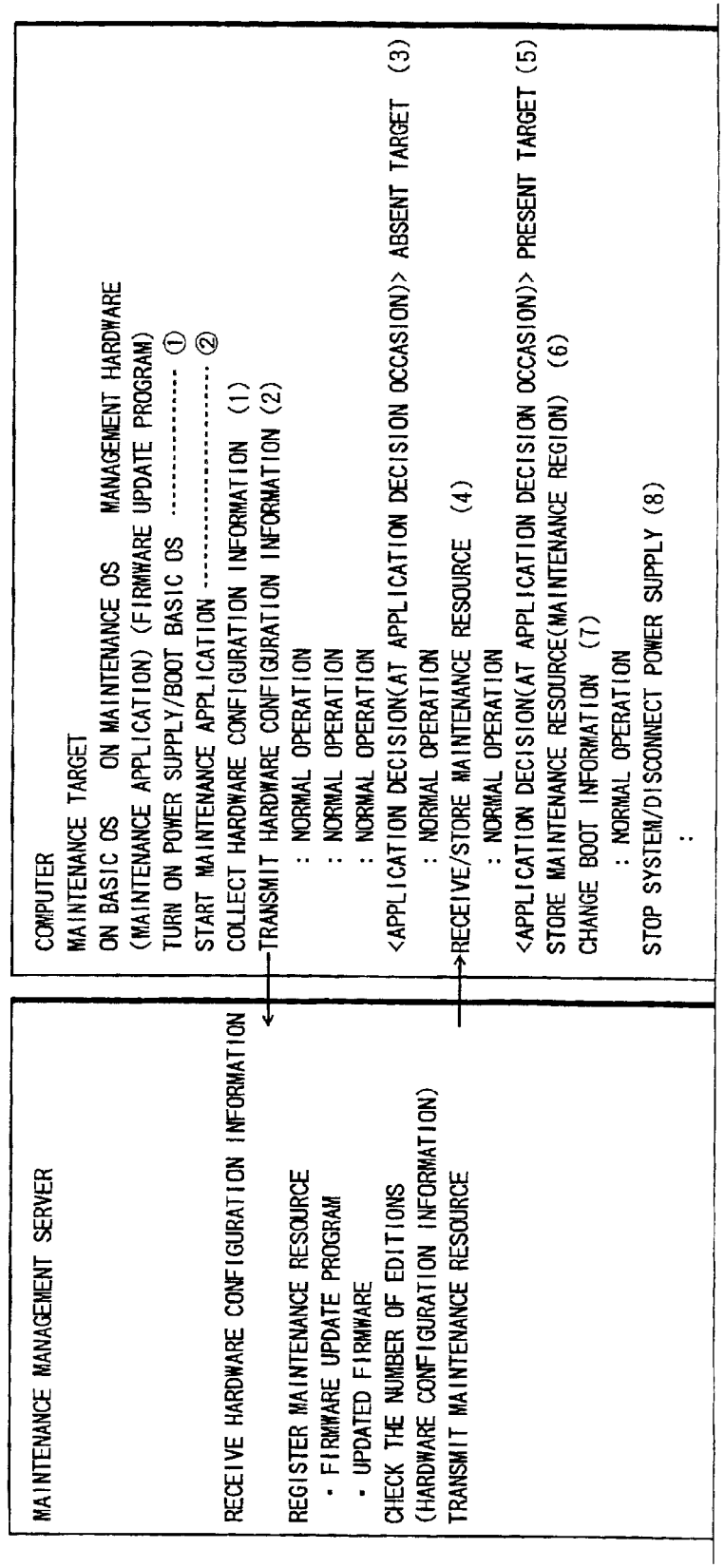

AUTOMATIC FIRMWARE VERSION UPGRADE SYSTEM

BACKGROUND OF THE INVENTION

1. Field of the Invention

The present invention relates to a computer which can automatically apply resources distributed through a network on a desired application occasion, and a computer readable recording medium on which a program which realizes the computer is recorded.

In a computer, when version-up for a firmware is to be performed, an installed firmware must be updated into the firmware whose version-up has been performed. It is desirable that a technique which makes it possible to automatically update a firmware be constructed.

2. Description of the Prior Arts

Conventionally, when a firmware to be used in a computer is subjected to version-up, a service person goes to a user's house with a CD-ROM or the like on which the firmware whose version-up has been performed and a program used which exchanges firmwares are recorded, and manually exchanges the version-up firmware with an old firmware to perform a version-up operation. On the other hand, with the spreading of Web servers, a user browses a list of software provided by a maker, selects a software to be downloaded from the list, and downloads and installs the new software from a Web server. Also, in this case, ultimately, a method that a software is manually downloaded and installed by a user is used. As in the conventional technique, when resources such as firmwares are input to computers with manual operations of service persons or users, the resources to be input to the computers cannot be rapidly input. More specifically, unless service persons or users perform operations, resources which have been subjected to version-up cannot be input to computers. For this reason, the resources to be input cannot be rapidly input to the computers. When a certain computer detects an abnormality in a resource such as a program, a maker will perform version-up of the resource in accordance with the abnormality. However, the operation of detecting the abnormality of the resource is not always performed in another computer. For this reason, many users do not know that the resource must be exchanged.

SUMMARY OF THE INVENTION

As one of means of the version-up state, the present assignee proposed, in Japanese Patent Application Laid-Open (JP-A) No.2000-96557, a remote maintenance technique in which, when pieces of constituent information of terminals connected to a network are automatically collected from the terminals to form a new resource to be distributed to a terminal, a terminal to which the new resource must be distributed is specified, so that the new resource is automatically distributed to the terminal to which the new resource must be distributed. At this time, a remote maintenance technique is proposed in which the terminal sets whether the resource automatically distributed is stood by application or is immediately executed, and, according to the result, the resource to be automatically distributed is applied.

According to the present invention, the remote maintenance technique which was proposed by an another prior application is advanced, a new computer which makes it possible to automatically apply a resource to be distributed through a network on a desired application occasion is provided.

A computer according to the present invention is characterized by comprising: a reception unit which receives resource information transmitted through a network and constituted by a resource for version-up of a firmware or the like and an application program which applies the resource and storing the resource information in an operation region of a storage device; a decision unit which decides whether an application occasion of the resource has come or not; and an execution unit which, when it is decided that the application occasion has come, performs a process of copying the resource information in a maintenance region of the storage device and making the maintenance region valid in the next boot-up operation of a system.

When the application program is started in response to the boot-up operation of the system, the process of making the operation region valid in the next boot-up operation of the system is executed. After an application process of the resource is performed, and when the application process is failed, the application program performs a process of rebooting the system. The application program performs a process of deleting resource information application of which is completed from the operation region and the maintenance region.

The computer of the present invention is constituted by hardware, and comprises a management mechanism which is operated by a power supply other than that of the computer body, receives process time information issued by an application program, and monitors the process time information to monitor the operation of the application program. The management mechanism comprises: an update unit which performs a process of making the operation region valid in the next boot operation of the system when an abnormality of the application program is detected; and a rebooting unit which performs a process of rebooting the system subsequent to the process of the update unit. The management mechanism further comprises an invalidating unit which invalidates a power supply disconnect request and a reset request for a computer body issued during an operation of the application program. The management mechanism further comprises a notification unit which notifies a resource distribution source of application failure of the resource when an abnormality of the application program is detected, an abnormal notice is received from the application program, a power supply of the computer body is disconnected during the operation of the application program, and when the computer body is reset during the operation of the application program.

According to the computer of the present invention, a resource distributed through the network can be automatically applied on a desired application occasion. For this reason, a maker need not send service persons one by one, and need not receive complaints of users who do not care updating of resources. A user can update a resource into a necessary one without scanning update information provided by a maker. In addition, in order to realize this, the present invention employs a configuration in which a normal operation process can be continued even if it fails an application process of the resource. For this reason, the normal operation process is not adversely affected. Furthermore, in order to realize this, according to the present invention, if the resource cannot be applied for some reason, the resource is an object to be applied again on a next application occasion. For this reason, the resource can be reliably updated into a necessary resource.

According to the present invention, a new computer readable recording medium on which a program which realizes automatically applying a resource distributed through a network on a desired application is stored, occasion is provided. The computer readable recording medium is characterized in that a program which causes a computer to execute: the process of receiving resource information transmitted through a network and constituted by a resource and an application program which applies the resource and storing the resource information in an operation region of a storage device; the process of deciding whether an application occasion of the resource has come or not; and the process of copying the resource information in a maintenance region of the storage device and making the maintenance region valid in the next boot-up operation of a system is recorded. The details of the program recorded on the recording medium is the same as that of the device configuration.

The above and other objects, features, and advantages of the present invention will become more apparent from the following detailed description with reference to the drawings.

BRIEF DESCRIPTION OF THE DRAWINGS

FIGS. 3A to 3C are diagrams which explains the data structure of a system disk;

FIG. 4 is a diagram which explains the data structure of a system disk;

FIGS. 5A and 5B are diagrams which explains the data structure of a system disk;

FIGS. 6A and 6B are diagrams which explains a management hardware and a peripheral device thereof;

FIG. 7 is a block diagram of one embodiment of a hardware mechanism held by the management hardware;

FIGS. 8A and 8B are flow charts of processes of executing a maintenance application;

FIGS. 10A, 10B and 10C are flow charts of control processes performed by the management hardware;

FIGS. 12A and 12B are time charts of execution processes of the management hardware when application of the update firmware is not normally ended by abnormality detection; and FIGS. 13A and 13B are time charts of execution processes of the management hardware when application of the update firmware is not normally ended by time-out detection.

DETAILED DESCRIPTION OF THE PREFERRED EMBODIMENT

Figure 1:
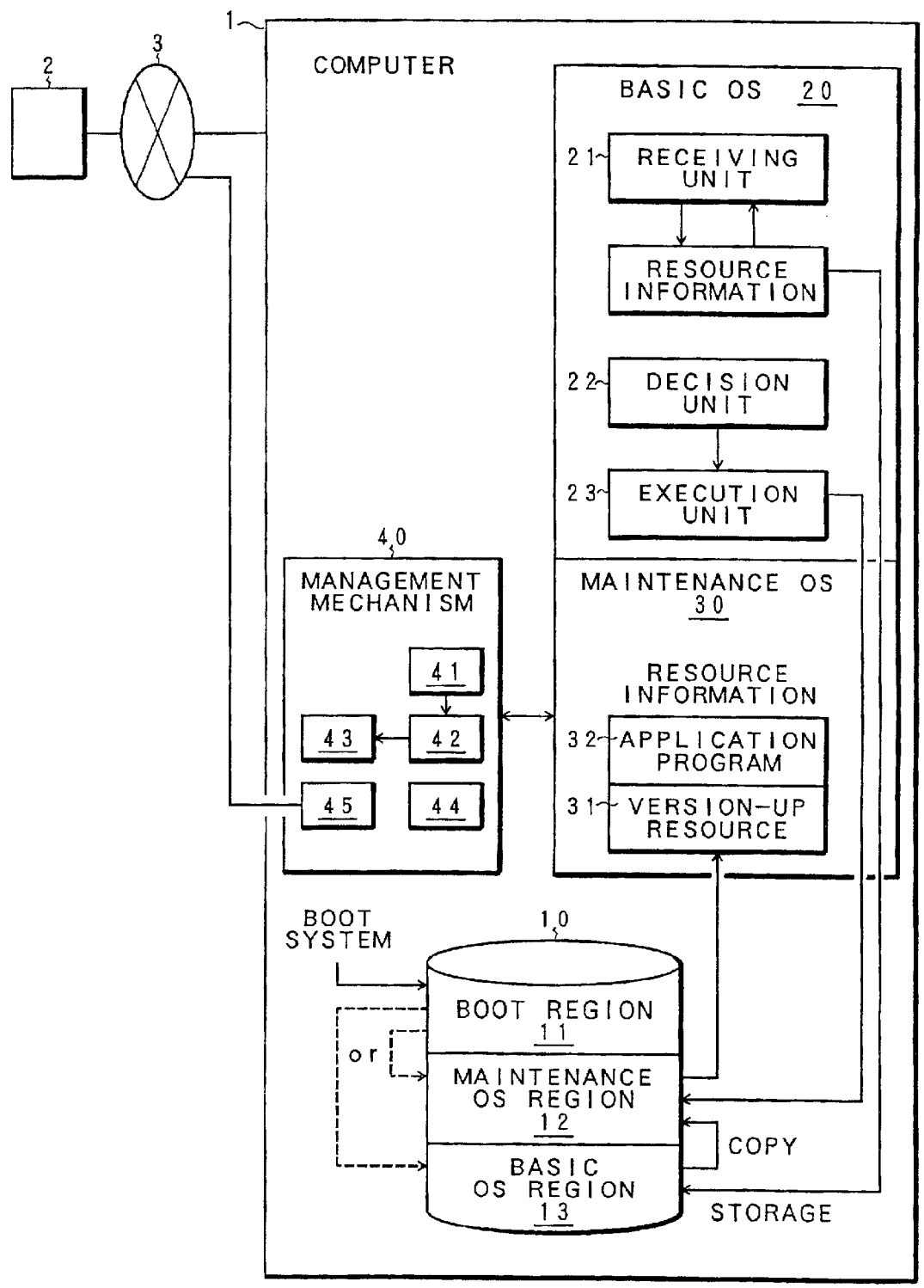
FIG. 1 is a block diagram of a functional configuration according to the present invention.

In FIG. 1, a computer 1 to which the present invention is applied is connected to a maintenance management server 2 through a network 3 such as a LAN, and the maintenance management server 2 distributes resource information constituted by a resource which performs version-up of a firmware and an application program which applies the resource. The computer 1 comprises a system disk 10 which stores boot information, a basic OS 20 which executes a normal operation process, a maintenance OS 30 which executes an application process of the resource distributed from the maintenance management server 2, and a management mechanism 40 constituted by a hardware and operated by a power supply other than that of a computer body. The system disk 10 comprises a boot region 11 which stores boot information which describes whether the basic OS 20 is booted or the maintenance OS 30 is booted in a boot operation of the system, a maintenance OS region 12 prepared for a maintenance operation process, and a basic OS region 13 prepared for a normal operation process. Under the control of the basic OS 20, a reception unit 21 which receives resource information distributed from the maintenance management server 2 to store the resource information in the basic OS region 13, a decision unit 22 which decides whether an application occasion of the resource distributed from the maintenance management server 2 has come or not, and an execution unit 23 which copies the resource information distributed from the maintenance management server 2 into the maintenance OS region 12 when the decision unit 22 decides that the application occasion has come, and updating the boot information such that the maintenance OS region 12 is called in the next boot operation of the system, are developed. The reception unit 21, the decision unit 22, and the execution unit 23 are read from the basic OS region 13 according to the description of the boot information in response to the boot operation of the system to be developed. Under the control of the maintenance OS 30, a resource 31 distributed from the maintenance management server 2 and an application program 32 which applies the resource 31 are developed. The resource 31 and the application program 32 are read from the maintenance OS region 12 according to the description of the boot information in response to the boot operation of the system to be developed. When the application program 32 is started in response to the boot operation of the system, the application program 32 performs a process of updating the boot information such that the basic OS region 13 is called in the next boot operation of the system. After the application process of the resource 31, and when the application process is failed, the application program 32 performs a process of rebooting the system. The application program 32 performs a process of deleting the resource information of the resource 31 application of which is completed from the maintenance OS region 12 and the basic OS region 13. The management mechanism 40 comprises a monitor unit 41 which receives process time information issued by the application program 32 and monitoring the process time information to perform a process of monitoring the operation of the application program 32, an update unit 42 which performs a process of updating boot information such that the basic OS region 13 is called in the next boot operation of the system when the monitor unit 41 detects an abnormality of the application program 32, a rebooting unit 43 which performs a process of rebooting the system subsequent to the process of the update unit 42, an invalidating unit 44 which invalidates a power supply disconnection request and a reset request for a computer body issued during the operation of the application program 32, and a notification unit 45 which performs a process of notifying the maintenance management server 2 of application failure of the resource 31. In the computer 1 of the present invention constituted as described above, when the reception unit 21 receives resource information (resource+application program) distributed from the maintenance management server 2 during execution of a normal operation process, the reception unit 21 stores the resource information in the basic OS region 13. The decision unit 22, e.g., periodically, decides whether an application occasion of the received resource has come or not during the execution of the normal operation process. In accordance with the process of the decision unit 22, when the decision unit 22 decides that the application occasion has come, the execution unit 23 copies (writes) the received resource information in the maintenance OS region 12 and updates the boot information such that the maintenance OS region 12 is called in the next boot operation of the system. Thereafter, the normal operation process is ended, and the system is booted at regulated time. At this time, since the boot information indicates the maintenance OS region 12, the resource 31 and the application program 32 are read from the maintenance OS region 12 and developed under the control of the maintenance OS 30. In this manner, the application program 32 is started, and a process which applies the resource 31 is executed. When the application program 32 is started, first, the application program 32 performs a process of updating the boot information such that the basic OS region 13 is called in the next boot operation of the system. Subsequently, according to the process phase for example, when the application program 32 executes an application process of the resource 31 while notifying the management mechanism 40 of the process time information and completes the application process, the application program 32 performs the process of rebooting the system. At this time, since the boot information indicates the basic OS region 13, the normal operation process is executed by using a new resource distributed from the maintenance management server 2. The application program 32 deletes the resource information of the resource 31 application of which is completed from the maintenance OS region 12 and the basic OS region 13 to perform the process such that overlapping application processes are not executed. When the process configuration is employed, if an abnormality is generated in the application program 32, the management mechanism 40 updates the boot information such that the basic OS region 13 is called in the next boot operation of the system and performs the process of rebooting the system, so that, in place of the application program 32, the management mechanism 40 performs the process of the application program 32. When a power supply disconnection request and a reset request are issued during execution of the application process of the resource 31, the management mechanism 40 invalidates the power supply disconnection request and the reset request to perform control such that the application process is not interrupted. In this manner, according to the computer 1 of the present invention, a resource distributed through the network can be automatically applied on a desired application occasion. In addition, in order to realize this, in the computer 1 according to the present invention employs a configuration in which a normal operation process can be continued even though an application process of a distributed resource is failed. For this reason, the normal operation process is not influenced.

Figure 2B:
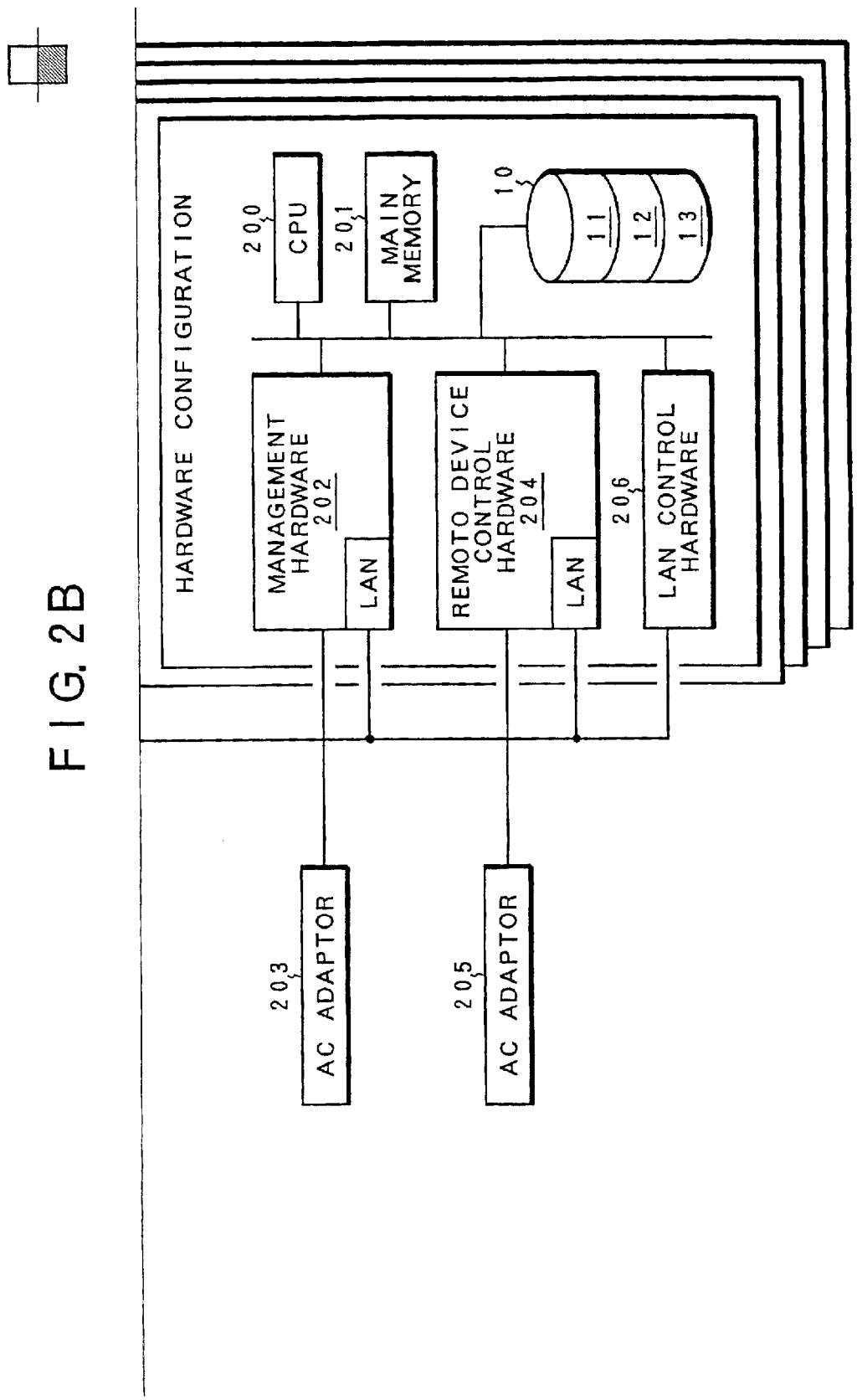
FIG. 2 is a block diagram of one embodiment of the present invention.

FIG. 2 is an embodiment of the computer 1 according to the present invention. The same reference numerals as in FIG. 1 denote the same parts in FIG. 2. The computer 1 and the maintenance management server 2 are connected to each other through a LAN 3a. The maintenance management server 2 comprises a maintenance management application 300 which executes a maintenance process for each computer 1, a hardware configuration information table 301 which manages latest hardware configuration information of each computer 1, and a maintenance resource 302 (which also manages which specific computer 1 the firmware is to be distributed) constituted by an update firmware distributed to the computer 1 and a firmware update program prepared as a tool which exchanges the firmware with the update firmware. The maintenance management application 300 acquires the latest hardware configuration information of each computer 1 transmitted from the computer 1 and registers the latest hardware configuration information in the hardware configuration information table 301. When a hindrance of firmware is generated in any one of the computers 1, the maintenance management application 300 acquires the information of the hindrance and notifies a design center (not shown) of the hindrance information to instruct the design center to update the firmware in which the hindrance is generated, and the maintenance management application 300 acquires an update firmware formed in response to the instruction. When the maintenance management application 300 acquires the update firmware, the maintenance management application 300 refers to the hardware configuration and the hardware configuration information table 301 and specifies a computer 1 to which the update firmware is to be distributed to form the maintenance resource 302. The maintenance management application 300, e.g., periodically, distributes the new registered maintenance resource 302 to the computer 1 serving as a distribution destination to instruct each computer 1 to update the firmware in which a hindrance is generated with an update firmware whose version-up is completed. When each computer 1 receives a maintenance resource (update firmware+firmware update program) distributed from the maintenance management application 300 as described above, the computer 1 performs a process of exchanging an old firmware which is used in this device and has not been updated with the distributed update firmware by using the distributed firmware update program. In order to perform the firmware exchange process, the computer 1 according to the present invention employs a configuration comprising not only the basic OS 20 which executes the normal operation process as described in FIG. 1, but also the maintenance OS 30 which executes a process of applying a firmware distributed from the maintenance management server 2. In accordance with this, the computer 1 employs a configuration comprising the boot region 11 which stores boot information which describes whether the basic OS 20 is booted or the maintenance OS 30 is booted in a boot operation of the system, the maintenance OS region 12 prepared for a maintenance operation process, and the basic OS region 13 prepared for a normal operation process.

FIGS. 3A to 3C show the data structure of the system disk 10. FIG. 3A shows a disk configuration, FIG. 3B shows a boot sector configuration, and FIG. 3C shows a partition table configuration managed by a boot sector. The means of signs used in the partition table are shown in FIG. 4. In this embodiment, it is supposed that the maintenance OS region 12 prepared for a maintenance operation process is developed in a partition indicated by an address "Ox1BE", and that the basic OS region 13 prepared for the normal operation process is developed in a partition indicated by an address "Ox1CE" of the system disk 10. As shown in FIG. 4, when "Ox80" is registered in a portion indicated by sign BI, the partition is active. In contrast to this, when "Ox00" is registered, the partition is inactive. For this reason, as shown in FIG. 5A, "Ox00" is written in the portion BI of the partition indicated by the address "Ox1BE" of the system disk 10, and "Ox80" is written in the portion BI of the partition indicated by the address "Ox1CE", the basic OS 20 is booted. On the other hand, as shown in FIG. 5B, when "Ox80" is written in the portion BI of the partition indicated by the address "Ox1BE" of the system disk 10, and when "OX00" is written in the portion BI of the partition indicated by the address "Ox1CE", the maintenance OS 30 is booted.

The computer 1 according to the present invention, as shown in FIG. 2, employs, as a software configuration, a configuration comprising a maintenance application 100 operated under the control of the basic OS 20 and a firmware update program 104 (distributed from the maintenance management server 2) operated under the control of the maintenance OS 30. Here, a maintenance resource 101 developed under the control of the basic OS 20 is a maintenance resource 302 distributed from the maintenance management server 2, and a hardware configuration information table 102 developed under the control of the basic OS 20 manages hardware configuration information transmitted to the maintenance management server 2. An update firmware 103 developed under the control of the maintenance OS 30 is an update firmware held by the maintenance resource 302 distributed from the maintenance management server 2. The maintenance application 100 and the firmware update program 104 can be stored in an appropriate recording medium such as a computer readable semiconductor memory.

On the other hand, the computer 1 according to the present invention, as shown in FIG. 2, employs, as a hardware configuration, a configuration comprising a CPU 200, a main memory 201, a system disk 10, a management hardware 202 which receives a power supply (power supply of a route other than that of the computer body) from an AC adapter 203, a remote device control hardware 204 which receives a power supply (power supply of a route other than that of the computer body) from an AC adapter 205, and a LAN control hardware 206 which controls communication connection to the maintenance management server 2. In this case, a hard disk on which a firmware is actually loaded, an adapter, and the like are not shown. When the management hardware 202 monitors the operation of the firmware update program 104 operated under the control of the maintenance OS 30 to detect an abnormality, a necessary countermeasure process is executed. In addition, the remote device control hardware 204 receives an instruction from a remote device (not shown), and performs a process of issuing a power supply disconnection instruction and a reset instruction to a device control hardware (indicated by 207 in FIGS. 6A and 6B to be described later) which performs a process for power supply control or the like of the computer body.

Figure 6A:
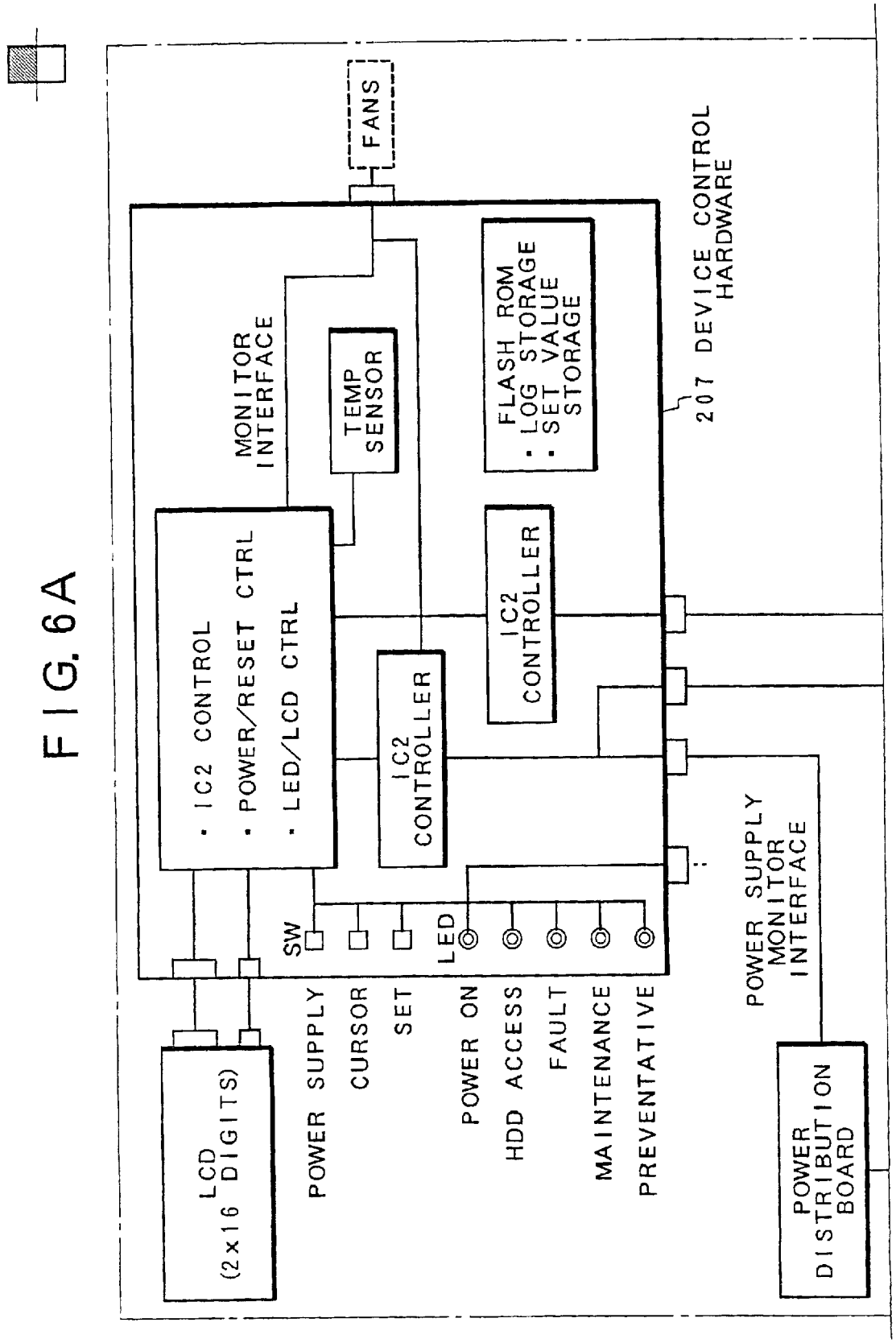

As shown in FIGS. 6A and 6B, the management hardware 202 employs a configuration in which a device control instruction for the device control hardware 207 issued by the remote device control hardware 204 is received through a signal line indicated by a in FIGS. 6A and 6B, and the received device control instruction is relayed to the device control hardware 207 through a signal line indicated by β in FIGS. 6A and 6B.

FIG. 7 shows an embodiment of a hardware mechanism (comprising the interface controller shown in FIGS. 6A and 6B) held by the management hardware 202. The management hardware 202 comprises a main control mechanism 400 which executes a control process of an entire hardware, a time monitor mechanism 401 which monitors the operation of the firmware update program 104 with a timer, a main body monitor mechanism 402 which monitors whether unexpected power supply disconnection caused by a manual operation occurs or a reset instruction is issued or not, an interface mechanism 403 which controls an interface process between the remote device control hardware 204 and the computer body, a LAN control mechanism 404 which controls communication connection to the maintenance management server 2, a device control cut-off mechanism 405 which cuts off a device control instruction for the device control hardware 207 issued by the remote device control hardware 204, and a firmware update in-process flag 406 which indicates whether an exchange process of firmwares is being performed.

Figure 8B:
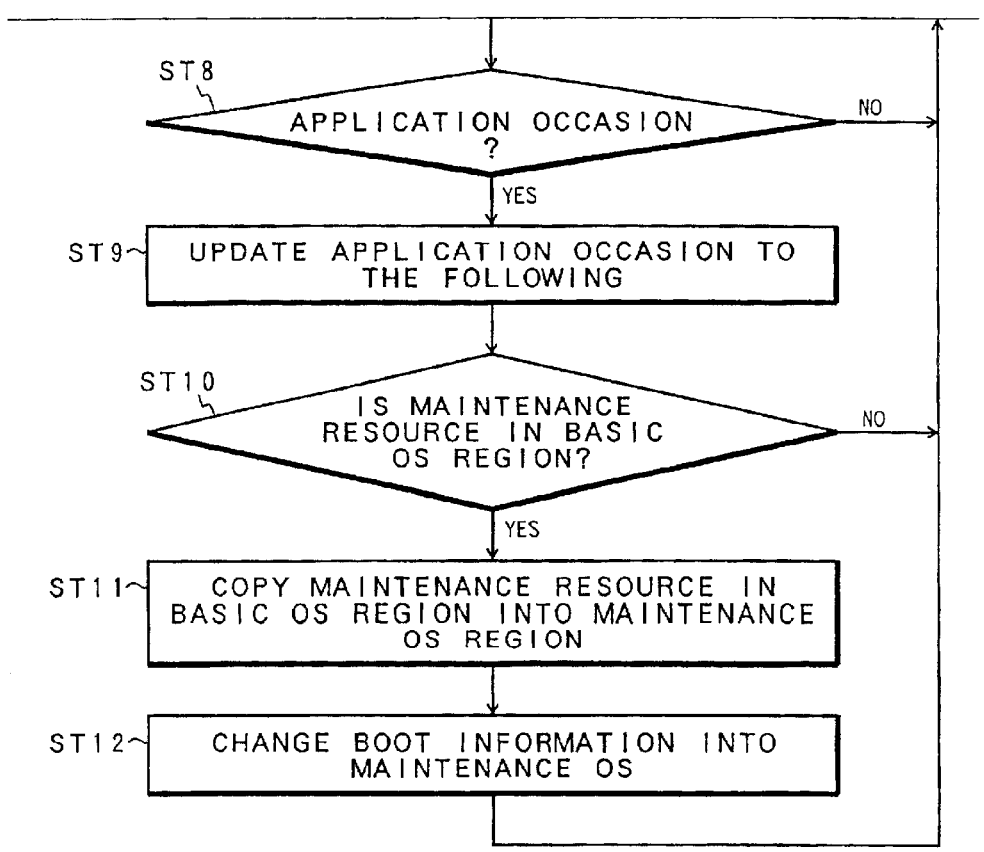
Figure 9A:
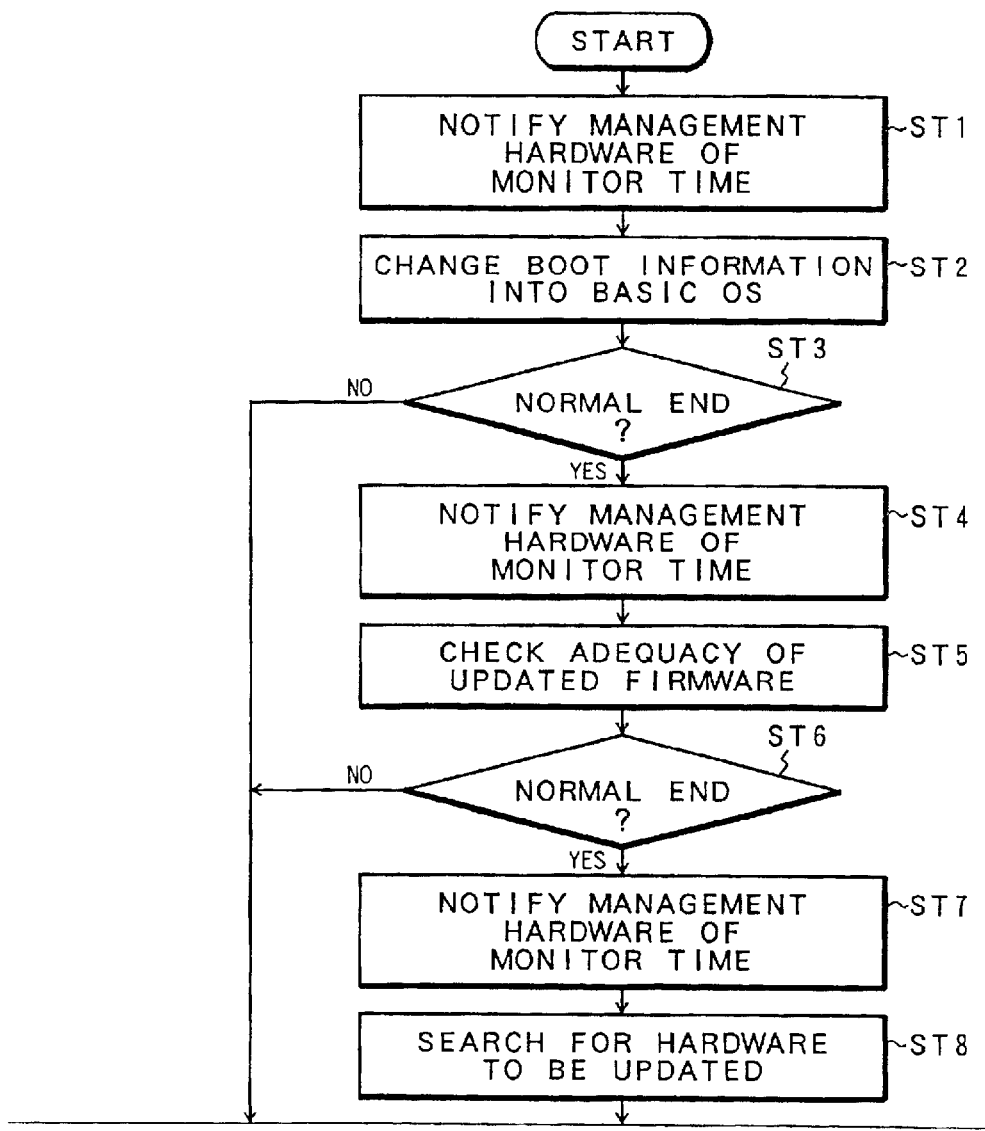
FIGS. 9A and 9B are flow charts of processes of executing a firmware update program.
Figure 9B:
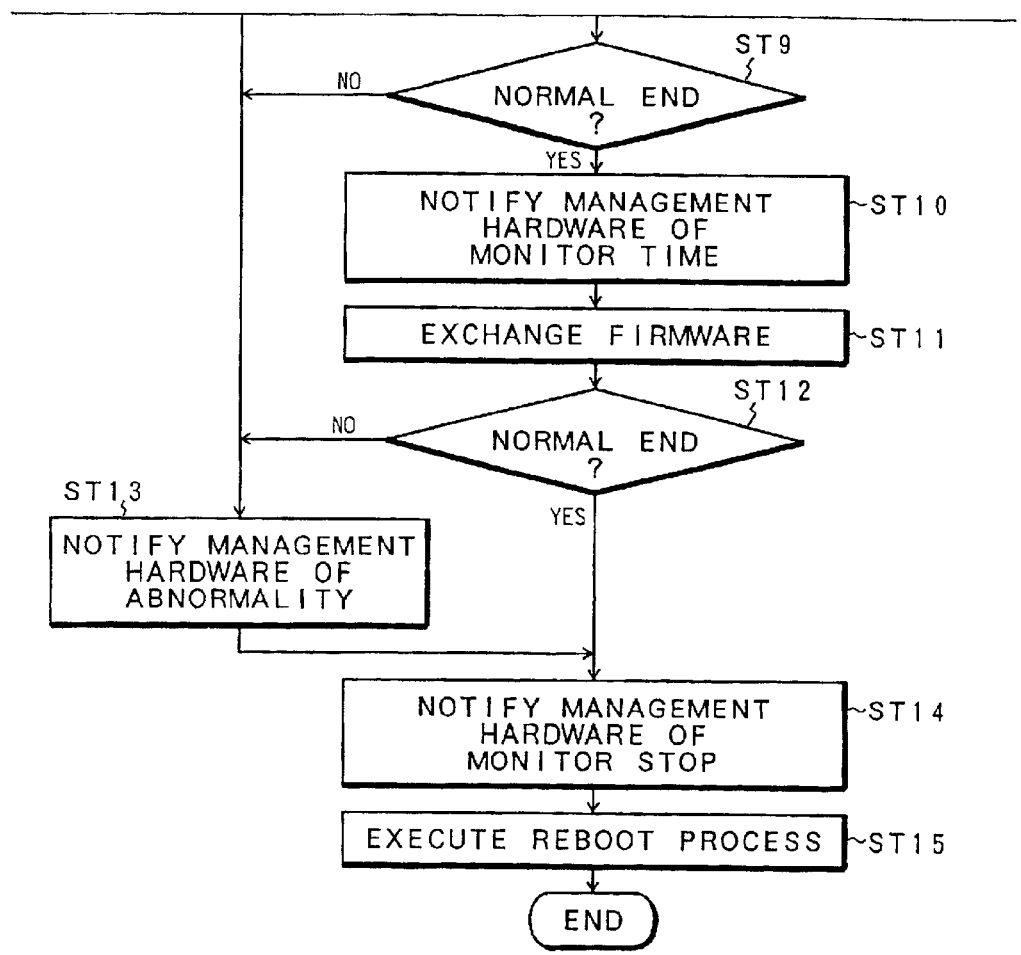
Figure 10B:
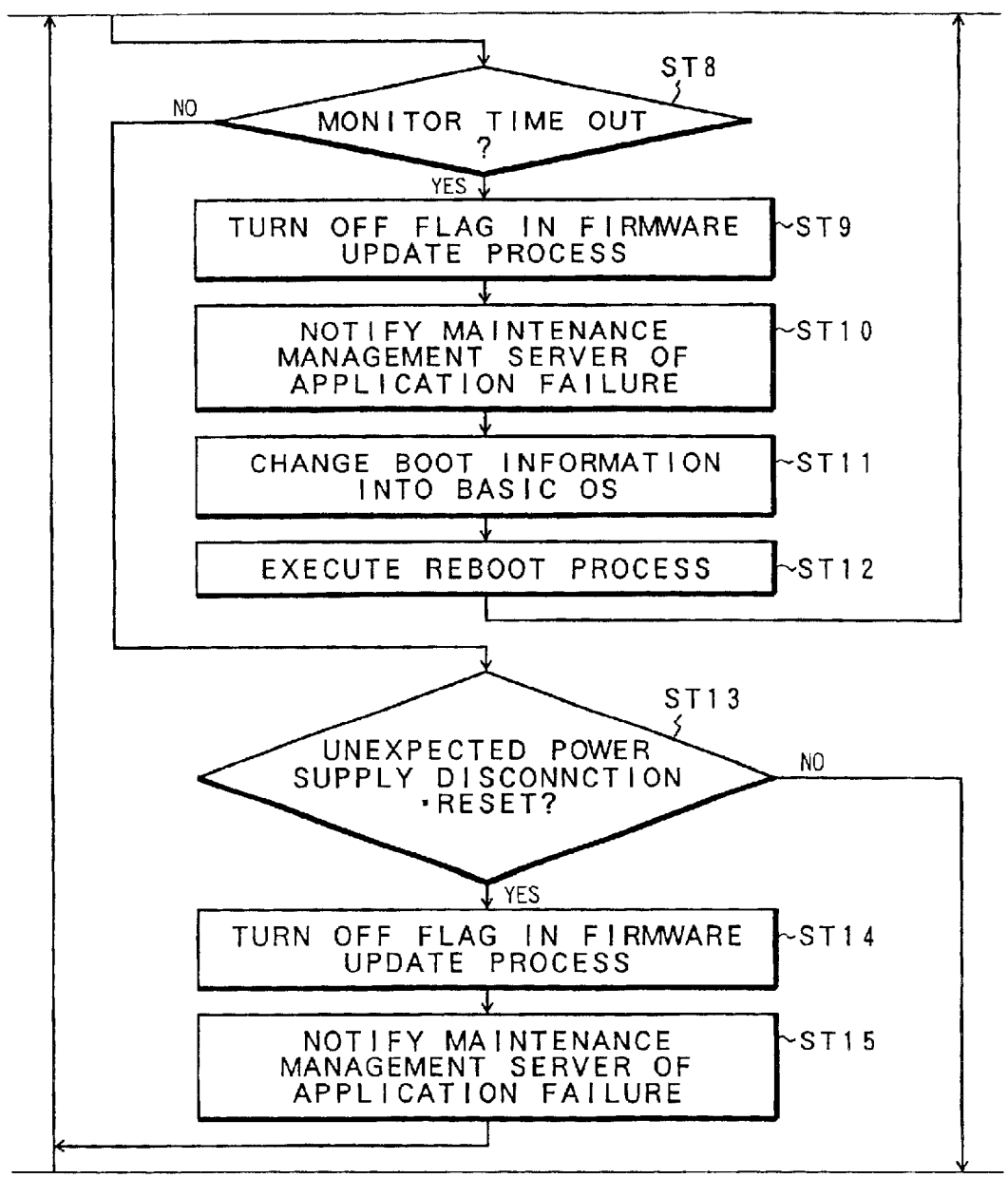
Figure 10C:
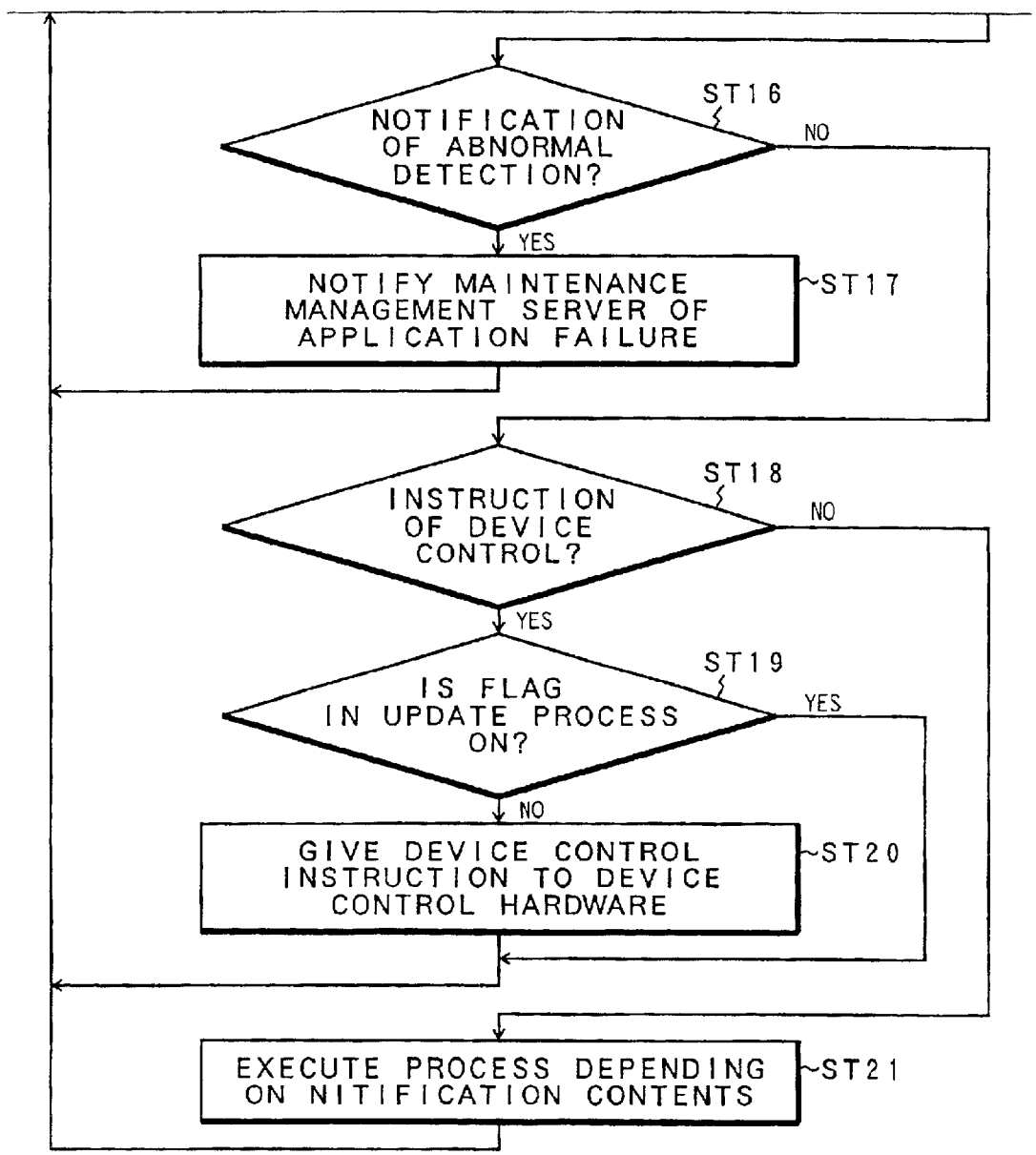

FIGS. 8A to 8C show an embodiment of a process flow executed by the maintenance application 100 operated under the control of the basic OS 20 as flow charts, FIGS. 9A and 9B show an embodiment of a process flow executed by the firmware update program 104 operated under the control of the maintenance OS 30 as flow charts, and FIGS. 10A to 10D show processes of one embodiment of processes executed by the main control mechanism 400 of the management hardware 202 as flow charts.

Processes of the present invention will be described in detail below according to these flow charts. When the maintenance application 100 is started in response to a boot operation of the system such that boot information (partition table) makes the basic OS region 13 active, and, as shown in FIG. 8A, when a maintenance resource is stored in the maintenance OS region 12 of the system disk 10 in step 1 first, the maintenance application 100 deletes the maintenance resource. As is apparent from the following description, since a maintenance resource to which an update firmware is successfully applied (exchanged with an old firmware) and a maintenance resource to which the update firmware is unsuccessfully applied may be stored in the maintenance OS region 12 of the system disk 10, when these maintenance resources are stored, these maintenance resources are deleted. Subsequently, in step 2, hardware configuration information of the self-device is employed, and the hardware configuration information is transmitted to the maintenance management server 2. As described above, when the maintenance management server 2 receives the transmitted hardware configuration information to acquire a new formed update firmware, a process is performed such that a computer 1 to which the update firmware is to be distributed is specified to distribute. Subsequently, in step 3, it is decided whether a maintenance resource is stored in the basic OS region 13 of the system disk 10 or not. As is apparent from the following description, since a maintenance resource to which the update firmware is successfully applied (exchanged), a maintenance resource to which the update firmware is unsuccessfully applied, and a maintenance resource to which the update firmware is not tried to be applied may be stored in the basic OS region 13 of the system disk 10, first, it is decided whether these maintenance resources are stored or not. When it is decided by the decision process in step 3 that the maintenance resources are stored in the basic OS region 13 of the system disk 10, the flow shifts to step 4 to decide whether the stored maintenance resources have been applied or not. This decision process is performed such that the version number of a firmware applied according to hardware configuration information employed in step 2 is acquired and compared with the version number of the update firmware stored in the basic OS region 13. When it is decided in the decision process in step 4 that the maintenance resources stored in the basic OS region 13 have been applied, the flow shifts to step 5 to delete the maintenance resources which have not been applied from the basic OS region 13. On the other hand, when it is decided that the maintenance resources stored in the basic OS region 13 have not been applied, i.e., that the maintenance resources are unsuccessfully applied or are not applied yet, the process in step 5 is omitted to leave these maintenance resources as objects to be applied. Subsequently, it is decided in step 6 whether a maintenance resource is distributed from the maintenance management server 2 or not. When it is decided that the maintenance resource is distributed, the flow shifts to step 7 to receive the distributed maintenance resource (indicated by 101 in FIG. 2) and store the maintenance resource in the basic OS region 13 of the system disk 10. Subsequently, it is decided in step 8 whether an application occasion of a preset firmware has come or not. When it is decided that the application occasion has not come, the flow returns to step 6 to receive the maintenance resource distributed from the maintenance management server 2 and to wait until the application occasion of the firmware has come. An application occasion of the firmware set at this time can be freely set as follows. For example, the firmware is applied in the next boot operation of the system, the firmware is applied at 9 o'clock on Monday, the firmware is applied at 17 o'clock on the end of a month, or the firmware is manually applied. When it is decided in the decision process of step 8 that the application occasion of the firmware has come, the flow shifts to step 9 to update the application occasion into the next application occasion. Subsequently, it is decided in step 10 whether a maintenance resource is stored in the basic OS region 13 of the system disk 10 or not. When it is decided that the maintenance resource is not stored, the flow directly returns to step 6 to receive the maintenance resource distributed from the maintenance management server 2 and to wait until the application occasion of the firmware has come. On the other hand, when it is decided in step 10 that the maintenance resource is stored in the basic OS region 13 of the system disk 10, the flow shifts to step 11 to copy the maintenance resource in the maintenance OS region 12 of the system disk 10. At this time, as the maintenance resources stored in the basic OS region 13 includes a maintenance resource which is not an object to be deleted in step 5 and which is unsuccessfully applied and a maintenance resource which is newly distributed. For this reason, the former is copied from the basic OS region 13 to the maintenance OS region 12, and the latter is copied into the maintenance OS region 12 because the maintenance resource which is newly distributed is held (also written in the basic OS region 13). Subsequently, boot information (partition table) is updated such that the maintenance OS region 12 is active in step 12, the flow returns to step 6 to receive the maintenance resource distributed from the maintenance management server 2 and to wait until the application occasion of the firmware has come. In this manner, the maintenance application 100 receives the maintenance resource distributed from the maintenance management server 2 to be stored in the basic OS region 13 of the system disk 10. When the application occasion of the firmware has come, the maintenance resource which is unsuccessfully applied in the previous application process and the maintenance resource distributed between the previous application occasion and the present application occasion are copied in the maintenance OS region 12, and a process is performed to update boot information such that the maintenance OS region 12 is active in the next boot operation of the system. According to the update process of the boot information by the maintenance application 100, the maintenance resource (update firmware 103+firmware update program 104) stored in the maintenance OS region 12 of the system disk 10 is read in the next boot operation of the system, so that the firmware update program 104 operated under the control of the maintenance OS 30 is started as shown in FIG. 2.

When the firmware update program 104 is started in this manner, first, as shown in FIGS. 9A and 9B, first, in the step 1, the firmware update program 104 notifies the management hardware 202 of monitor time (e.g., twice time) determined on the basis of time required for the process in the next step 2. When the management hardware 202 receives the notice, the time monitor mechanism 401 of the management hardware 202 starts a timer-monitor process. When next monitor time is not notified from the firmware update program 104 within the notified monitor time, a process is performed such that an abnormality in the firmware update program 104 is decided. Subsequently, boot information (partition table) is updated to make the basic OS region 13 active in step 2. More specifically, in the next boot operation of the system, a setting is performed such that the basic OS region 13 serving as a normal operation process is active. Subsequently, it is decided in step 3 whether the process in step 2 can be normally ended or not. When it is decided that the process cannot be normally ended, the flow shifts to step 13 to notify the management hardware 202 of the abnormality. On the other hand, when it is decided that the process can be normally ended, the flow shifts to step 4 to notify the management hardware 202 of monitor time (e.g., twice time) determined on the basis of time required for the process in the next step 5. When the management hardware 202 receives the notice, the time monitor mechanism 401 of the management hardware 202 starts the timer-monitor process. When the next monitor time is not notified from the firmware update program 104 within the notified monitor time, a process is performed such that the abnormality of the firmware update program 104 is determined. Subsequently, a check process such as check sum is executed in step 5 to check the adequacy of the update firmware 103 read from the maintenance OS region 12. Subsequently, it is decided in step 6 whether the process in step 5 can be normally ended or not. When it is decided that the process cannot be normally ended, the flow shifts to step 13 to notify the management hardware 202 of the abnormality. On the other hand, when it is decided that the process can be normally ended, the flow shifts to step 7 to notify the management hardware 202 of monitor time (e.g., twice time) determined on the basis of time required for the process in the next step 8. When the management hardware 202 receives this notice, the time monitor mechanism 401 of the management hardware 202 starts the timer-monitor process. When the next monitor time is not notified from the firmware update program 104 within the notified monitor time, a process is performed such that the abnormality of the firmware update program 104 is determined. Subsequently, a hardware (adapter or the like) to be updated in the update firmware 103 is retrieved. Subsequently, it is decided in step 9 that the process in step 8 can be normally ended or not. When it is decided that the process cannot be normally ended, the flow shifts to step 13 to notify the management hardware 202 of the abnormality. On the other hand, it is decided that the process can be normally ended, the flow shifts to step 10 to notify the management hardware 202 of monitor time (e.g., twice time) determined on the basis of time required for the process in the next step 11. When the management hardware 202 receives the notice, the time monitor mechanism 401 of the management hardware 202 starts a timer-monitor process. When the next monitor time is not notified from the firmware update program 104 within the notified monitor time, a process is performed such that the abnormality of the firmware update program 104 is determined. Subsequently, in step 2, boot information (partition table) is updated such that the basic OS region 13 is active. More specifically, in the next boot-up operation of the system, a setting is performed such that the basic OS region 13 serving as a normal operation process is active. Subsequently, it is decided in step 3 whether the process in step 2 can be normally ended or not. When it is decided that the process cannot be normally ended, the flow shifts to step 13 to notify the management hardware 202 of the abnormality. On the other hand, when it is decided that the process can be normally ended, the flow shifts to step 4 to notify the management hardware 202 of monitor time (e.g., twice time) determined on the basis of time required for the process in the next step 5. When the management hardware 202 receives the notice, the time monitor mechanism 401 of the management hardware 202 starts the timer-monitor process. When the next monitor time is not notified from the firmware update program 104 within the notified monitor time, a process is performed such that the abnormality of the firmware update program 104 is determined. Subsequently, a check process such as check sum is executed in step 5 to check the adequacy of the update firmware 103 read from the maintenance OS region 12. Subsequently, it is decided in step 6 whether the process in step 5 can be normally ended or not. When it is decided that the process cannot be normally ended, the flow shifts to step 13 to notify the management hardware 202 of the abnormality. On the other hand, it is decided that the process can be normally ended, the process shifts to step 7 to notify the management hardware 202 of monitor time (e.g., twice time) determined on the basis of time required for the process in the next step 8. When the management hardware 202 receives the notice, the time monitor mechanism 401 of the management hardware 202 starts the timer-monitor process. When the next monitor time is not notified from the firmware update program 104 within the notified monitor time, a process is performed such that the abnormality of the firmware update program 104 is determined. Subsequently, hardware (adapter or the like) to be updated in the update firmware 103 is retrieved. Subsequently, it is decided in step 9 that the process in step 8 can be normally ended or not. When it is decided that the process cannot be normally ended, the flow shifts to step 13 to notify the management hardware 202 of the abnormality. On the other hand, it is decided that the process can be normally ended, the flow shifts to step 10 to notify the management hardware 202 of monitor time (e.g., twice time) determined on the basis of time required for the process in the next step 11. When the management hardware 202 receives the notice, the time monitor mechanism 401 of the management hardware 202 starts a timer-monitor process. When the next monitor time is not notified from the firmware update program 104 within the notified monitor time, a process is performed such that the abnormality of the firmware update program 104 is determined. Subsequently, an old firmware held by the hardware retrieved in step 8 is exchanged with the update firmware 103 in step 11, so that a process of applying the update firmware 103 is executed. Subsequently, it is decided in step 12 whether the process in step 11 can be normally ended or not. When it is decided that the process cannot be normally ended, the flow shifts to step 13 to notify the management hardware 202 of the abnormality. When it is decided in step 12 that the process can be normally ended, or the process in step 13 is ended, the flow shifts to step 14 (process flow in FIG. 10) to notify the management hardware 202 of monitor and stop. In the subsequent step 15, a reboot process (reset process) which reboots the system is executed to end the process. In this manner, the firmware update program 104 updates the boot information first such that the basic OS region 13 is active. For every process phase, monitor time is determined before the process phase is set to notify the management hardware 202 of the monitor time, and a firmware update application process is executed. When the application process cannot be normally ended, while the management hardware 202 is notified of the generation of the abnormality, finally, a process is performed such that the reboot process of rebooting the system is executed. When the application process cannot be ended, while the management hardware 202 is notified of the generation of the abnormality, finally, a process is performed such that the reboot process of rebooting the system is executed. In this case, although not described in the process flows in FIGS. 8A and 8B, while application of an update firmware distributed from the maintenance management server 2 is not completed, when the next update firmware which is a revision of the update firmware is distributed, in order to validate only the latest update firmware, a process of deleting the older new firmware stored in the basic OS region 13 and the maintenance OS region 12 of the system disk 10 is performed.

Figure 11A:
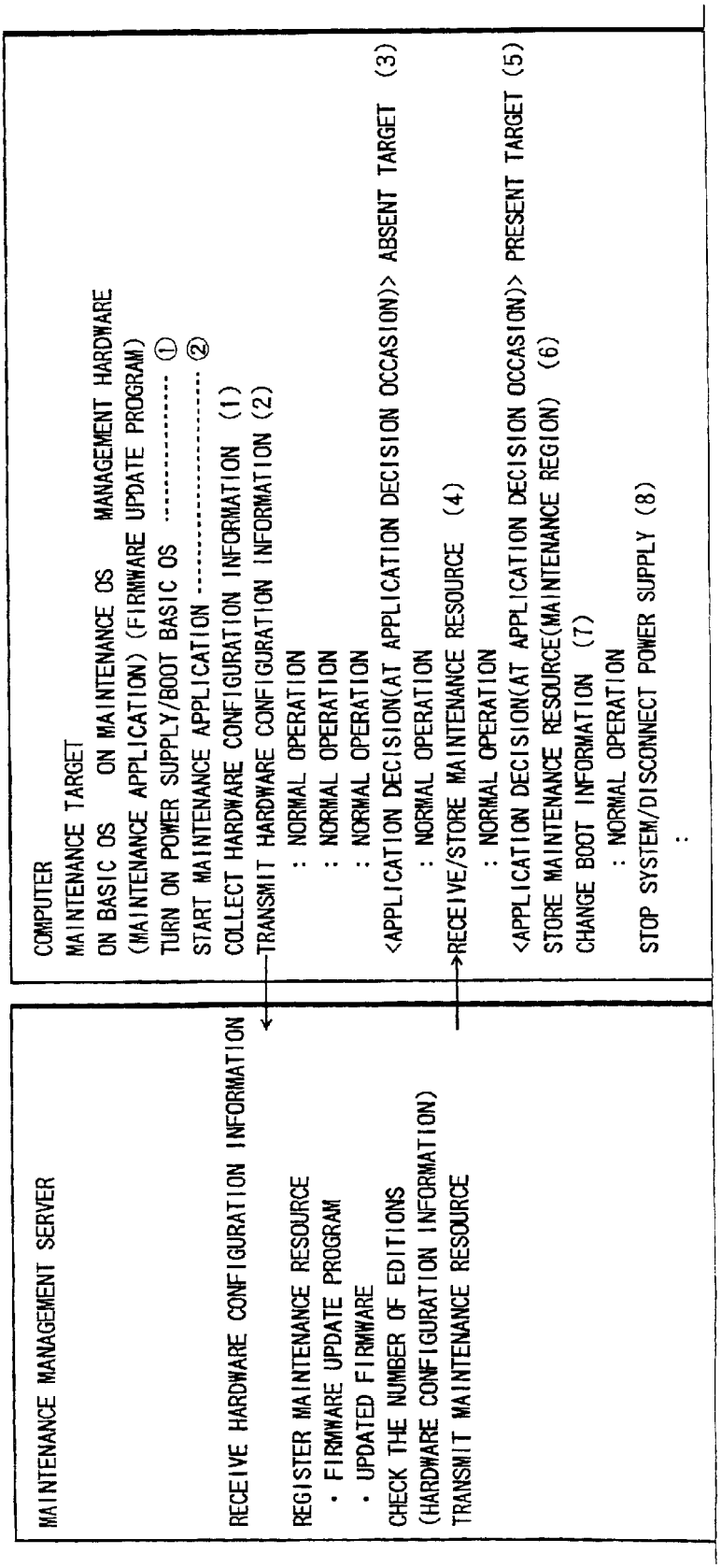
FIGS. 11A and 11B are time charts of execution processes of the management hardware when application of an update firmware is normally ended.
Figure 12B:
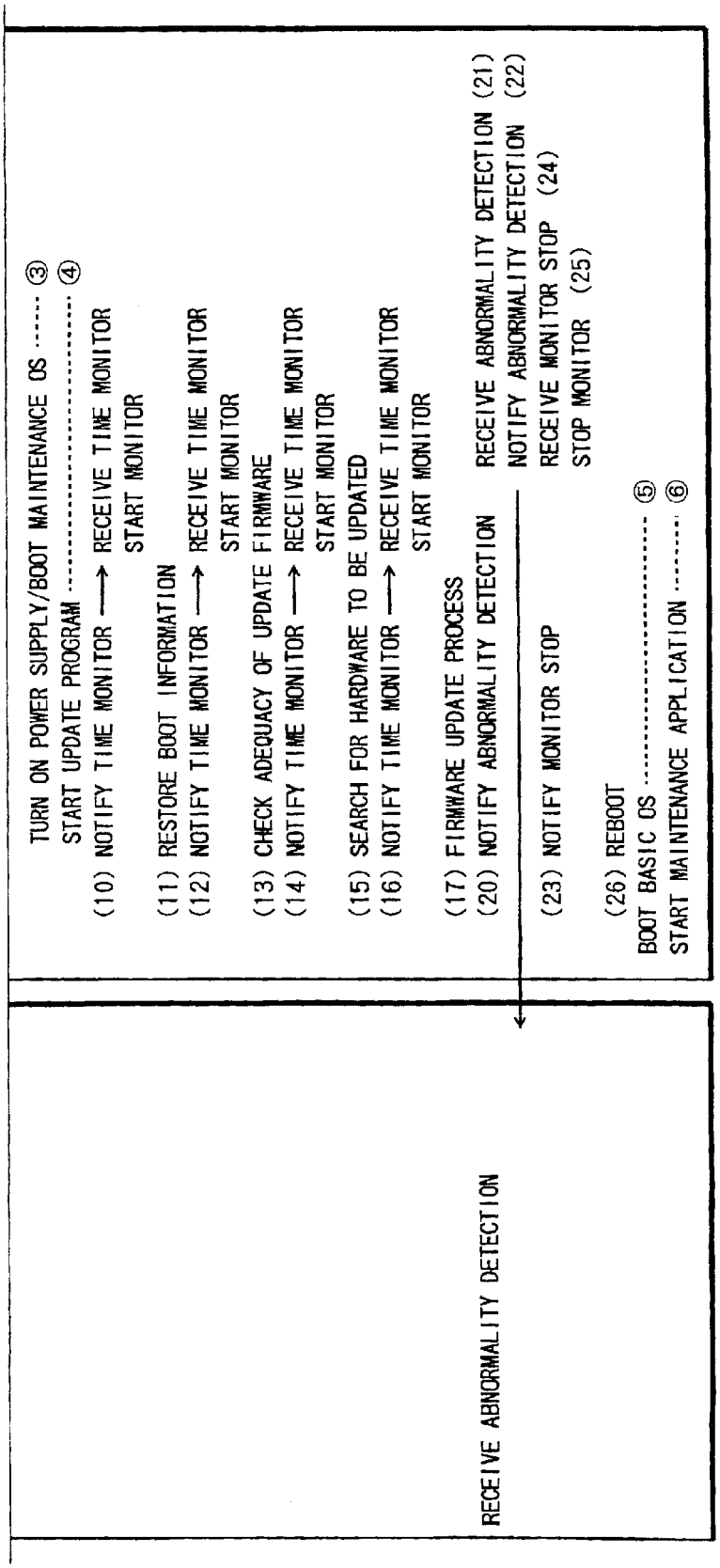
Figure 13B:
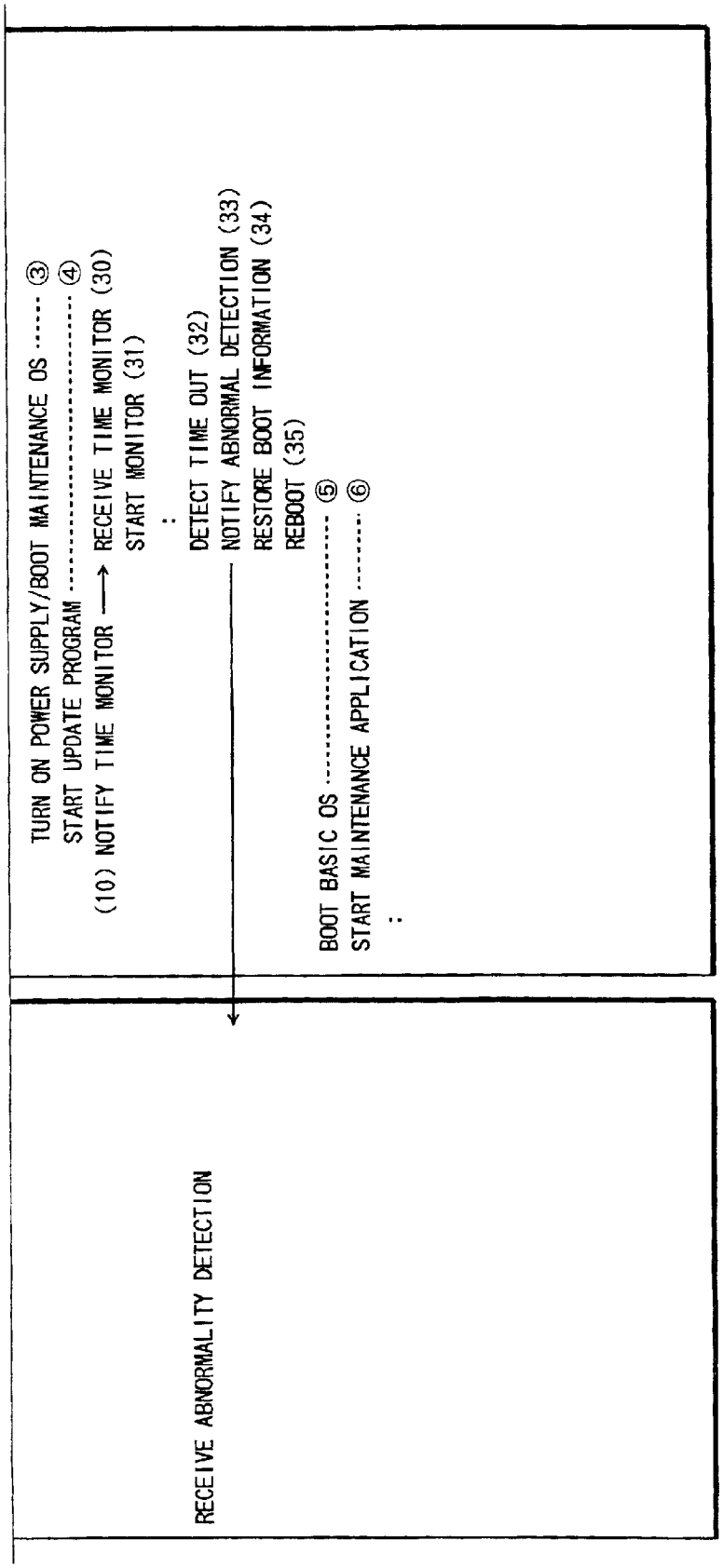

A process executed by the management hardware 202 will be described below according to FIGS. 10A to 10D. When the main control mechanism 400 of the management hardware 202 is started by turning on the power supply through the AC adapter 203, the main control mechanism 400 waits for a notice from the firmware update program 104, the time monitor mechanism 401, the main body monitor mechanism 402, or the remote device control hardware 204 in step 1. When the main control mechanism 400 receives the notice, the flow shifts to step 2 to decide whether the received notice is a notice of monitor time issued by the firmware update program 104 or not. When it is decided by the decision process that the notice is the notice of the monitor time issued by the firmware update program 104, the flow shifts to step 3 to turn on the firmware update in-process flag 406, so that it is set that the firmware application process is being performed. Subsequently, in step 4, the notified monitor time is designated, and the time monitor mechanism 401 is instructed to start the time monitor. The flow returns to step 1 to wait for the next notice. When the time monitor mechanism 401 receives this instruction, as described above, the time monitor mechanism 401 starts a timer-monitor process. When the next monitor time is not notified from the firmware update program 104 within the notified monitor time, a process in which an abnormality is generated in the firmware update program 104 is performed. On the other hand, when it is decided in step 2 that the received notice is not the notice of the monitor time issued by the firmware update program 104, the flow shifts to step 5 to decide whether the received notice is a notice of monitor stop issued by the firmware update program 104 or not. When it is decided by the decision process that the notice is the notice of monitor stop issued by the firmware update program 104, the flow shifts to step 6 to turn off the firmware update in-process flag 406, so that it is set that a firmware application process is not being performed. Subsequently, in step 7, the time monitor mechanism 401 is instructed to stop time monitor, and the flow returns to step 1 to wait for the next notice. On the other hand, it is decided in step 5 that the received notice is not the notice of monitor stop issued by the firmware update program 104, the flow shifts to step 8 to decide whether the received notice is a notice of time-out issued by the time monitor mechanism 401 or not. When it is decided by the decision process that the notice is the notice of time-out detected by the time monitor mechanism 401, the flow shifts to step 9 to turn off the firmware update in-process flag 406, so that it is set that the firmware application process is being performed. Subsequently, in step 10, the maintenance management server 2 is noticed through the LAN control mechanism 404 that application of the distributed update firmware 103 is failed. The update firmware 103 which fails in the application at this time is stored in the basic OS region 13 of the system disk 10, and is not deleted in step 5 of the process flow in FIG. 8 executed by the maintenance application 100, so that the update firmware 103 is set as an object to be applied on the next application occasion again. Subsequently, in step 11, boot information is updated such that the basic OS region 13 is active. More specifically, it is considered that the firmware update program 104 may not be able to update the boot information (when an abnormality is generated before step 2 of the process flow in FIG. 9), and, in place of this, the boot information is updated such that the basic OS region 13 is active. Subsequently, in step 12, in place of the firmware update program 104, a reboot process (reset process) of rebooting the system is executed, and the flow returns to step 1 to wait for the next notice. On the other hand, when it is decided in step 8 that the received notice is not the notice of time-out issued by the time monitor mechanism 401, the flow shifts to step 13 to decide whether the received notice is a notice issued by the main body monitor mechanism 402, i.e., a notice which notifies that application of a firmware is failed by unexpected power supply disconnection or by issuing a reset instruction or not. When it is decided by the decision process that the notice is the notice issued by the main body monitor mechanism 402, the flow shifts to step 14 to turn off the firmware update in-process flag 406, so that it is set that the firmware application process is not being performed. Subsequently, in step 15, the maintenance management server 2 is noticed through the LAN control mechanism 404 that application of the distributed update firmware 103 is failed, and the flow returns to step 1 to wait for the next notice. The update firmware 103 whose application is failed is stored in the basic OS region 13 of the system disk 10, and is not deleted in step 5 in FIG. 8A executed by the maintenance application 100, so that the update firmware 103 is set as an object to be applied on the next application occasion again. Subsequently, when it is decided in step 13 that the received notice is not the notice issued by the main body monitor mechanism 402, the flow shifts to step 16 to decide whether the received notice is a notice (notice issued in step 13 in FIG. 9B) of abnormal detection issued by the firmware update program 104 or not. When it is decided by the decision process that the notice is the notice of abnormal detection issued by the firmware update program 104, the flow shifts to step 17 to notify the maintenance management server 2 through the LAN control mechanism 404 that application of the distributed update firmware 103 is failed, and the flow returns to step 1 to wait for the next notice. The update firmware 103 whose application is failed is stored in the basic OS region 13 of the system disk 10, and is not deleted in step 5 in FIG. 8A executed by the maintenance application 100, so that the update firmware 103 is set as an object to be applied on the next application occasion again. On the other hand, when it is decided in step 16 that the received notice is not the notice of abnormality detection issued by the firmware update program 104, the flow shifts to step 18 to decide whether the received notice is a notice (notice of power supply disconnection instruction or reset instruction for the device control hardware 207) of a device control instruction issued by the remote device control hardware 204 or not. When it is decided by the decision process that the notice is the notice of the device control instruction issued by the remote device control hardware 204, the flow shifts to step 19 to decide whether the firmware update in-process flag 406 is turned on or not. When the firmware update in-process flag 406 is turned off, the flow shifts to step 20, and the device control instruction issued by the remote device control hardware 204 is given to the device control hardware 207 without being cut. When the firmware update in-process flag 406 is turned on, it is inconvenient that power supply disconnection or reset is performed during a firmware application process. For this reason, the device control instruction is cut off not to be given to the device control hardware 207, and the flow returns to step 1 to wait for the next notice. When it is decided in step 18 that the received notice is not the notice of the device control instruction issued by the remote device control hardware 204, the flow shifts to step 21 to execute a process corresponding to the notice contents, and the flow returns to step 1 to wait for the next notice. In this manner, when the management hardware 202 monitors the operation of the firmware update program 104, and when an abnormality is generated in the firmware update program 104, the maintenance management server 2 is notified that the application of the update firmware 103 is failed, and, in place of the firmware update program 104, the management hardware 202 performs the process of the firmware update program 104. I.e., boot information is updated such that the basic OS region 13 is active, and therefore a process is performed such that a reboot process of rebooting the system is executed. FIGS. 11A to 13B are time charts of the processes in the embodiment described above. Here, FIGS. 11A and 11B are time charts obtained when the application process of the update firmware 103 is normally ended, FIGS. 12A and 12B are time charts obtained when the firmware update program 104 detects an abnormality by itself, and when the application process of the update firmware 103 is not normally ended, and FIGS. 13A and 13B are time charts obtained when time-out is detected by the management hardware 202, and when the application process of the update firmware 103 is not normally ended.

Figure 11B:

When the application process of the update firmware 103 performed by the firmware update program 104 is normally ended, as shown in the time charts in FIGS. 11A and 11B, 1 The basic OS 20 is booted by turning on the power supply, and 2 the maintenance application 100 is started.

When the maintenance application 100 is started as described above, the maintenance application 100

(1) collects hardware configuration information, and (2) transmits the collected hardware configuration information to the maintenance management server 2 to start a normal operation process.

(3) And the maintenance application 100 performs the normal application process without performing any operation when an application occasion has not come, (4) receives a maintenance resource when the it is distributed from the maintenance management server 2, (5) when the application occasion has come, (6) stores the distributed maintenance resource in the maintenance OS region 12, and (7) updates boot information such that the maintenance OS region 12 is active. A normal operation process is continued, and (8) stops the system to disconnect the power supply. Next, 3 the maintenance OS 30 is booted by turning on the power supply, and 4 the firmware update program 104 is started.

When the firmware update program 104 is started as described above, the firmware update program 104

(10) notifies the management hardware 202 of time monitor,

(11) update boot information such that the basic OS region 13 is active,

(12) notifies the management hardware 202 of time monitor, (13) checks the adequacy of the update firmware 103,

(14) notifies the management hardware 202 of time monitor,

(15) retrieves a hardware to be updated,

(16) notifies the management hardware 202 of time monitor,

(17) exchanges the update firmware 103 with the old firmware,

(18) notifies the management hardware 202 of monitor stop, and

(19) executes a reboot process to end the process.

Next, 5 the basic OS 20 is booted by turning on the power supply, and 6 the maintenance application 100 is started.

On the other hand, when the firmware update program 104 detects an abnormality by itself, and when the application process of the update firmware 103 is not normally ended, as shown in the time charts in FIGS. 12A and 12B, 1 the basic OS 20 is booted by turning on the power supply, and 2 the maintenance application 100 is started.

When the maintenance application 100 is started in this manner, the maintenance application 100

(1) collects hardware configuration information, (2) transmits the collected hardware configuration information to the maintenance management server 2 to start the normal operation process.

(3) performs a normal application process without performing any operation when an application occasion has not come, (4) receives a maintenance resource when the maintenance resource is distributed from the maintenance management server 2, (5) when the application occasion has come, (6) stores the distributed maintenance resource in the maintenance OS region 12, and (7) updates boot information such that the maintenance OS region 12 is active. The maintenance application 100 continues the normal operation process, (8) stops the system to disconnect the power supply.

Next, 3 the maintenance OS 30 is booted by turning on the power supply, and 4 the firmware update program 104 is started.

When the firmware update program 104 is started, the firmware update program 104

(10) notifies the management hardware 202 of time monitor,

(11) updates boot information such that the basic OS region 13 is active,

(12) notifies the management hardware 202 of time monitor,

(13) checks the adequacy of the update firmware 103,

(14) notifies the management hardware 202 of time monitor,

(15) retrieves a hardware to be updated,

(16) notifies the management hardware 202 of time monitor,

(17) exchanges the update firmware 103 with the old firmware,

(20) when an abnormality is detected during this exchange, notifies the management hardware 202 that the abnormality is detected.

The management hardware 202,

(21) when the management hardware 202 receives the abnormality notice,

(22) notifies the maintenance management server 2 of application failure.

The firmware update program 104, when the firmware update program 104 notifies the management hardware 202 of an abnormality, thereafter,

(23) notifies the management hardware 202 of monitor stop, and

(26) executes a reboot process to end the process.

Next, 5 the basic OS 20 is booted by turning on the power supply, and 6 the maintenance application 100 is started.

On the other hand, the management hardware 202 detects time-out, when an application process of the update firmware 103 is not normally ended, as shown in the time charts in FIGS. 13A and 13B, 1 the basic OS 20 is booted by turning on the power supply, and 2 the maintenance application 100 is started.

When the maintenance application 100 is started as described above, the maintenance application 100

(1) collects hardware configuration information, (2) transmits the collected hardware configuration information to the maintenance management server 2 to start a normal operation process.

(3) When an application occasion has not come, the maintenance application 100 performs a normal operation process without performing any operation, (4) receives a maintenance resource when the maintenance resource is distributed from the maintenance management server 2, (5) when the application occasion has come, (6) stores the distributed maintenance resource in the maintenance OS region 12, (7) updates boot information such that the maintenance OS region 12 is active. The maintenance application 100 continues the normal operation process, and (8) stops the system to disconnect the power supply.

Next, 3 the maintenance OS 30 is booted by turning on the power supply, and 4 the firmware update program 104 is started.

When the firmware update program 104 is started as described above, the firmware update program 104

(10) notifies the management hardware 202 of time monitor.

The management hardware 202,

(30) when the management hardware 202 receives a notice of the time monitor,

(31) starts timer-monitor,

(32) when the management hardware 202 detects time-out,

(33) notifies the maintenance management server 2 of application failure,

(34) updates boot information such that the basic OS region 13 is active,

(35) executes a reboot process to end the process.

Next, 5 the basic OS 20 is booted by turning on the power supply, and 6 the maintenance application 100 is started.

Although the present invention has been described above according to the illustrated embodiment, the present invention is not limited to the embodiment. For example, although the present invention has been described by using firmware update as a concrete example in the embodiment, the present invention is not applied to only a firmware.

What is claimed is:

1. A computer, comprising:
    a storage device having a boot region which stores boot information, a basic OS region which stores a basic OS and a maintenance OS region which stores a maintenance OS;
    a reception unit which receives resource information transmitted through a network and constituted by a resource and an application program which applies the resource and storing the resource information in an operation region of a storage device in a state of operation in which the basic OS is expanded from said basic OS region to a memory by means of the boot information of said boot region upon boot-up operation;
    a decision unit which decides whether an application occasion of the resource has come or not; and
    an execution unit which, when it is decided that the application occasion has come, performs a process of copying the resource information from the basic OS region to the maintenance OS region and modifies the boot information in said boot region so that said maintenance OS region is expanded and managed in the memory; wherein
    the maintenance OS including said resource information is expanded from said maintenance OS region to the memory by means of the boot information after modification upon the next boot-up, and the existing resource is updated by the version-up resource through execution of the application program in said resource information.

2. A computer according to claim 1, wherein the application program performs a process of rebooting the system after the application process of the resource and when the application process is failed.

3. A computer according to claim 1, wherein the application program performs a process of deleting a resource information of which is completed application from the operation region and the maintenance region.

4. A computer according to claim 1, comprising a management mechanism, constituted by a hardware and operated by a power supply other than that of the computer body, which receives process time information issued by the application program and monitoring the process time information to monitor the operation of the application program.

5. A computer according to claim 4, wherein the management mechanism comprising:
    an update unit which performs a process of making the operation region valid in the next boot-up operation of the system when an abnormality of the application program is detected;
    a reboot unit of performing a process of rebooting the system subsequent to the process of the update unit.

6. A computer according to claim 4, wherein the management mechanism further comprises an invalidating unit which invalidates a power supply disconnection request and a reset request for the computer body issued during the operation of the application program.

7. A computer according to claim 4, wherein the management mechanism further comprises a notification unit which notifies a distribution source of the resource of application failure of the resource when an abnormality of the application program is detected, when an abnormality notice is received from the application program, when the power supply of the computer body is disconnected during the operation of the application program, and the computer body is reset during the operation of the application program.

8. A computer readable recording medium on which a program which causes a computer to execute:
    the process of receiving resource information transmitted through a network and constituted by a resource and an application program which applies the resource and storing the resource information in the basic OS region of said storage device, in a state of management in which the basic OS is expanded from said basic OS region to a memory by means of the boot information of said boot region upon boot-up operation;
    the process of deciding whether an application occasion of the resource has come or not;
    the process of, when it is decided that the application occasion has come, copying the resource information from the basic OS region of said storage device to the maintenance OS region, and modifying the boot information in said boot region so that said maintenance OS region is expanded in the memory and managed; and
    the process of expanding the maintenance OS including said resource information from said maintenance OS region to the memory by means of the boot information after modification upon the next boot-up, and updating the existing resource by the version-up resource through execution of the application program contained in said resource information.

9. An application update process, comprising:

storing an application update in a basic OS storage region;

using maintenance OS region contents for control during the update process; and using contents of the basic OS region for control upon a reboot after the update process is complete.

* * * * *